United States Patent
Nakamura

(10) Patent No.: US 8,736,671 B2
(45) Date of Patent: May 27, 2014

(54) STEREOSCOPIC IMAGE REPRODUCTION DEVICE AND METHOD, STEREOSCOPIC IMAGE CAPTURING DEVICE, AND STEREOSCOPIC DISPLAY DEVICE

(71) Applicant: Fujifilm Corporation, Tokyo (JP)

(72) Inventor: Satoshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/660,575

(22) Filed: Oct. 25, 2012

(65) Prior Publication Data

US 2013/0044188 A1    Feb. 21, 2013

Related U.S. Application Data

(63) Continuation of application No. PCT/JP2011/060096, filed on Apr. 25, 2011.

(30) Foreign Application Priority Data

Apr. 28, 2010    (JP) ................................. 2010-103906

(51) Int. Cl.
*G06T 15/00* (2011.01)
(52) U.S. Cl.
USPC .................................. 348/46; 348/43; 348/51
(58) Field of Classification Search
USPC ................................................ 348/43, 46, 51
See application file for complete search history.

(56) References Cited

U.S. PATENT DOCUMENTS

| | | | |
|---|---|---|---|
| 6,163,337 A | 12/2000 | Azuma et al. | |
| 2006/0290778 A1 | 12/2006 | Kitaura et al. | |
| 2007/0257902 A1* | 11/2007 | Satoh et al. | 345/419 |
| 2009/0142041 A1* | 6/2009 | Nagasawa et al. | 386/124 |

FOREIGN PATENT DOCUMENTS

| | | | |
|---|---|---|---|
| JP | 2003-333621 A | 11/2003 | |
| JP | 2004-334833 A | 11/2004 | |
| JP | 2005-73049 A | 3/2005 | |
| JP | 2008-109267 A | 5/2008 | |

* cited by examiner

*Primary Examiner* — Sath V Perungavoor
*Assistant Examiner* — Jeffery Williams
(74) *Attorney, Agent, or Firm* — Birch, Stewart, Kolasch & Birch LLP

(57) ABSTRACT

A stereoscopic image is displayed with an appropriate amount of parallax based on auxiliary information recorded in a three-dimensional-image file. The size of a display which performs 3D display is acquired (Step S31), and a 3D image file is read (Step S32). The maximum display size capable of appropriately performing 3D display of each viewpoint image is acquired from metadata of the read 3D image file (Step S33), and the size acquired in Step S31 is compared with the maximum display size acquired in Step S33 (Step S34). Viewpoint numbers of images in which the maximum display size is larger are acquired (Step S35), the most appropriate image is selected from the images of the acquired viewpoint numbers (Step S37), and 3D display is performed using the selected image (Step S38). Therefore, an appropriate image can be selected based on the maximum display size and 3D display can be performed.

10 Claims, 37 Drawing Sheets

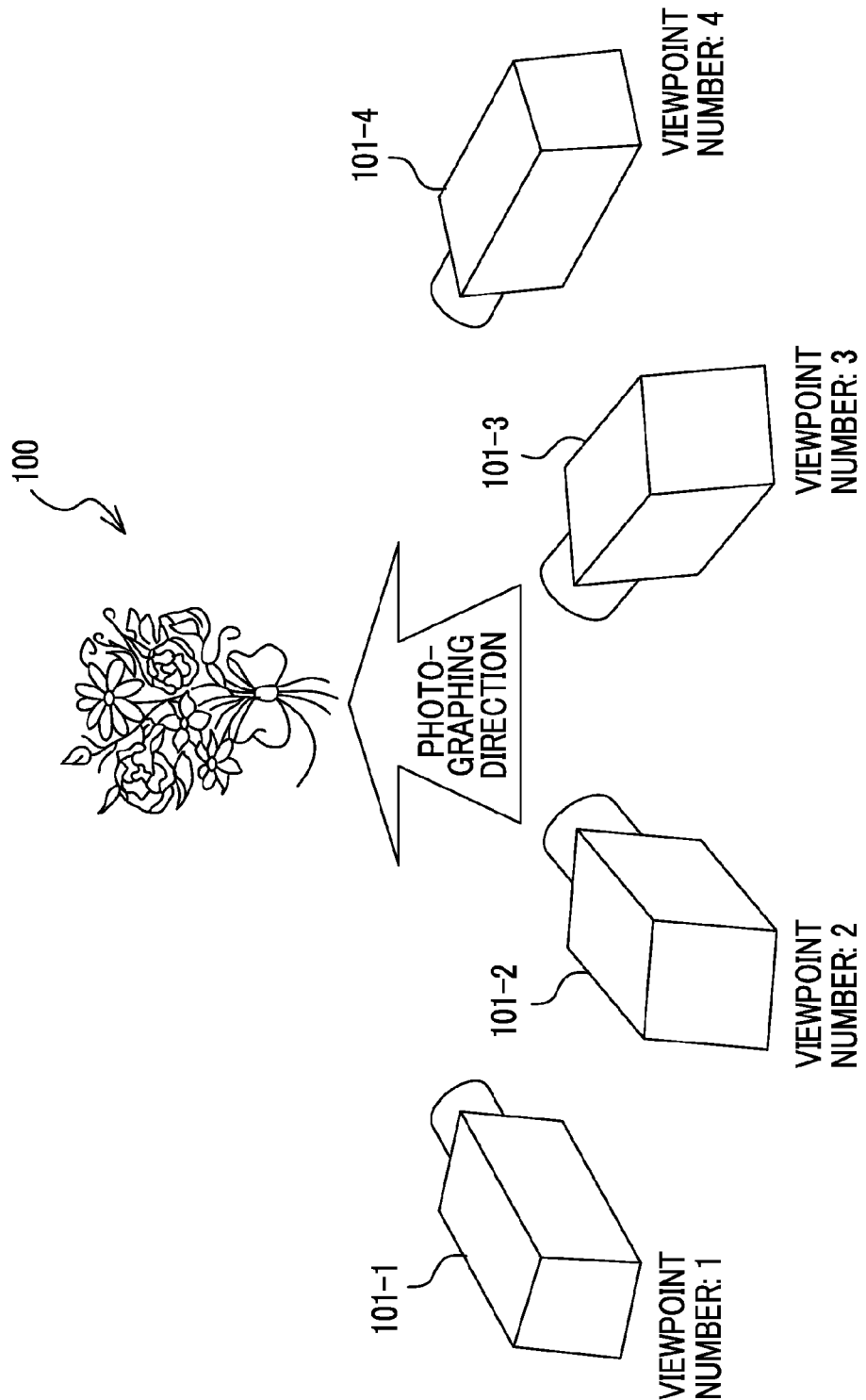

(CONT.)

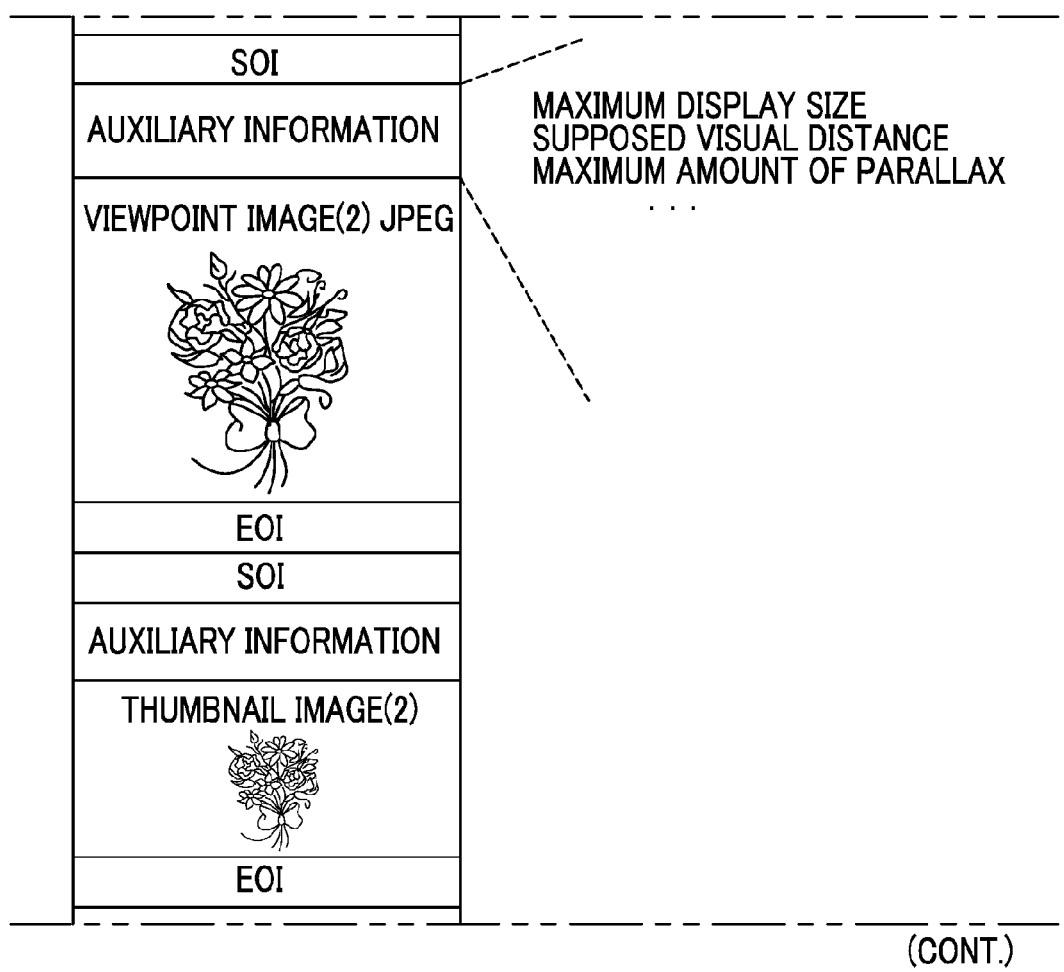

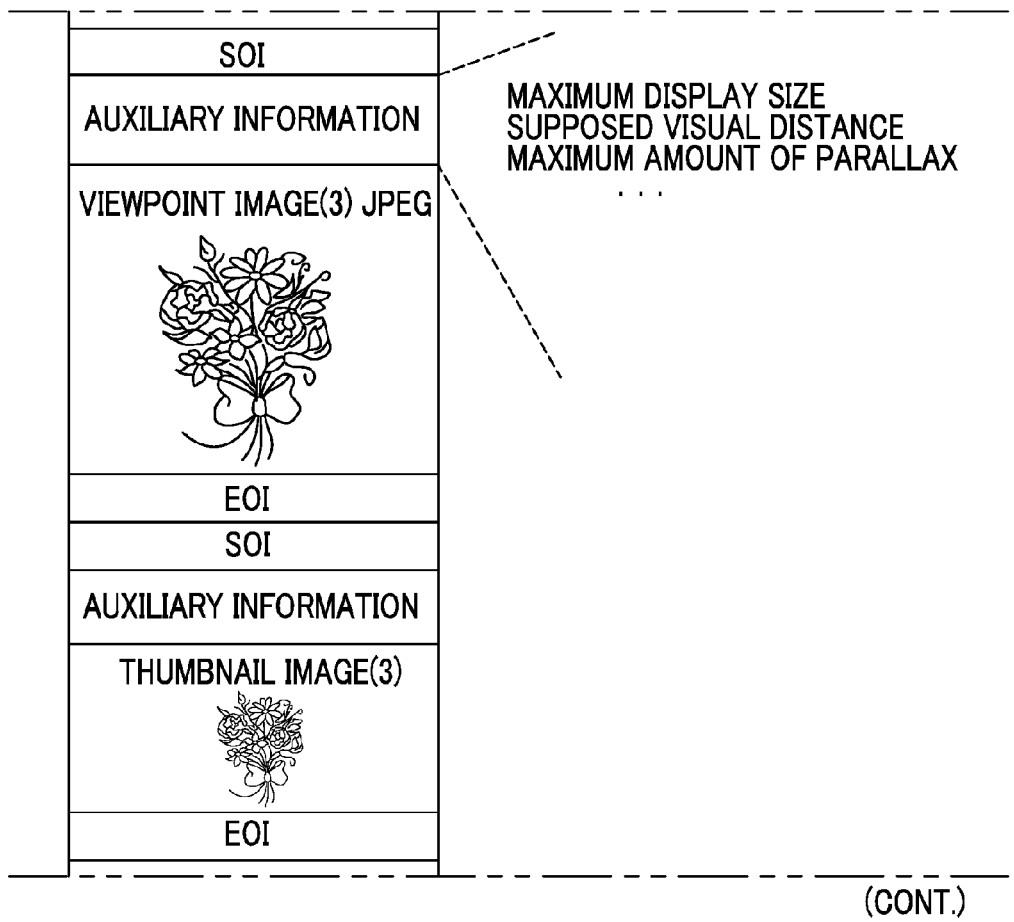

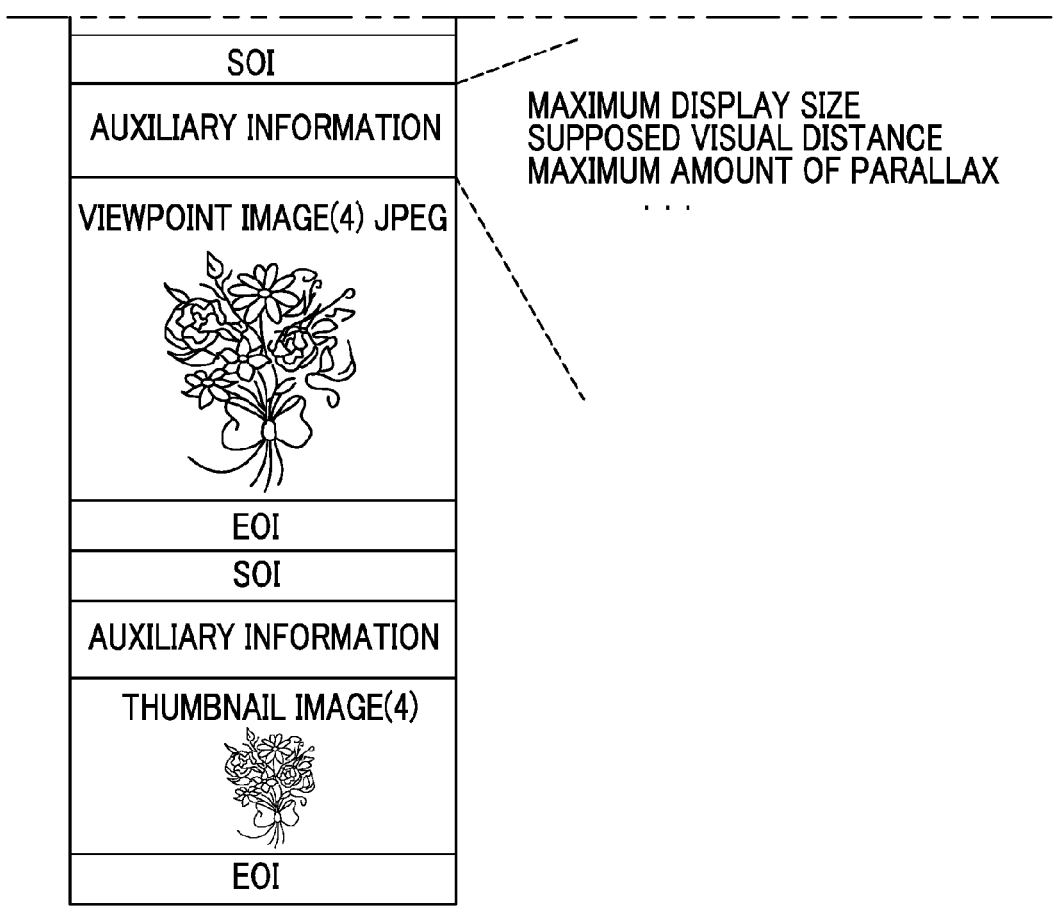
(FIG. 6 Continued)

FIG. 7A
| SOI |
| AUXILIARY INFORMATION |
| VIEWPOINT IMAGE(1) JPEG 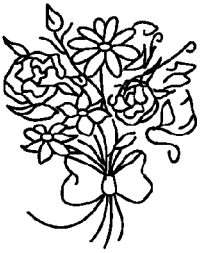 |
| EOI |
| SOI |
| AUXILIARY INFORMATION |
| THUMBNAIL IMAGE(1)  |
| EOI |
| SOI |
| AUXILIARY INFORMATION |
| THUMBNAIL IMAGE(2)  |
| EOI |
| SOI |
| AUXILIARY INFORMATION |
(CONT.)

(FIG. 7A Continued)
| THUMBNAIL IMAGE(3)  |
| :---: |
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(2) JPEG  |
| EOI |
| SOI |
| AUXILIARY INFORMATION |
(CONT.)

(FIG. 7A Continued)
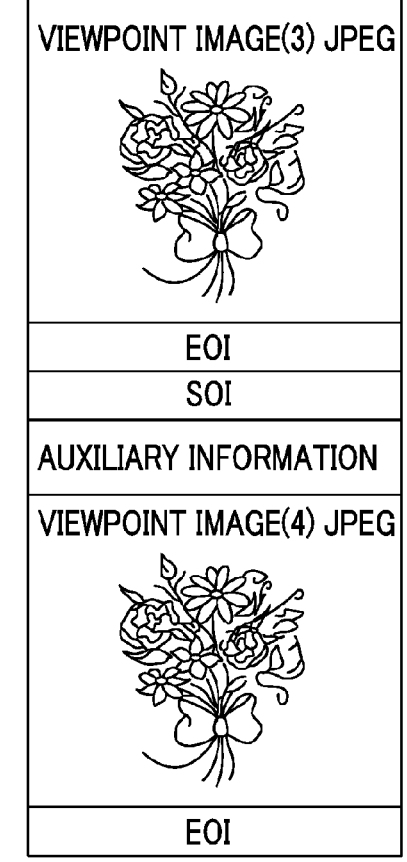

(CONT.)

(FIG. 7B Continued)
| THUMBNAIL IMAGE(1)  |
| --- |
| EOI |
| SOI |
| AUXILIARY INFORMATION |
| THUMBNAIL IMAGE(4)  |
| EOI |
| SOI |
| AUXILIARY INFORMATION |
| VIEWPOINT IMAGE(2) JPEG  |
| EOI |
| SOI |
| AUXILIARY INFORMATION |
(CONT.)

(FIG. 7B Continued)
| VIEWPOINT IMAGE(3) JPEG |
| --- |
| 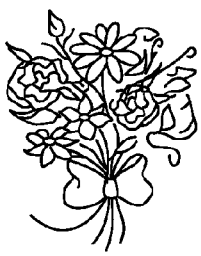 |
| EOI |
| SOI |
| AUXILIARY INFORMATION |
| VIEWPOINT IMAGE(4) JPEG |
| 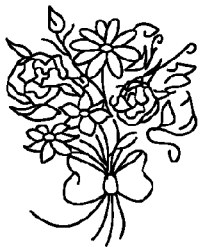 |
| EOI |

FIG. 7C

| SOI |
| AUXILIARY INFORMATION |
| VIEWPOINT IMAGE(1) JPEG |
| EOI |
| SOI |
| AUXILIARY INFORMATION |
| THUMBNAIL IMAGE(1) |
| EOI |
| SOI |
| AUXILIARY INFORMATION |
| THUMBNAIL IMAGE(3) |
| EOI |
| SOI |
| AUXILIARY INFORMATION |

(CONT.)

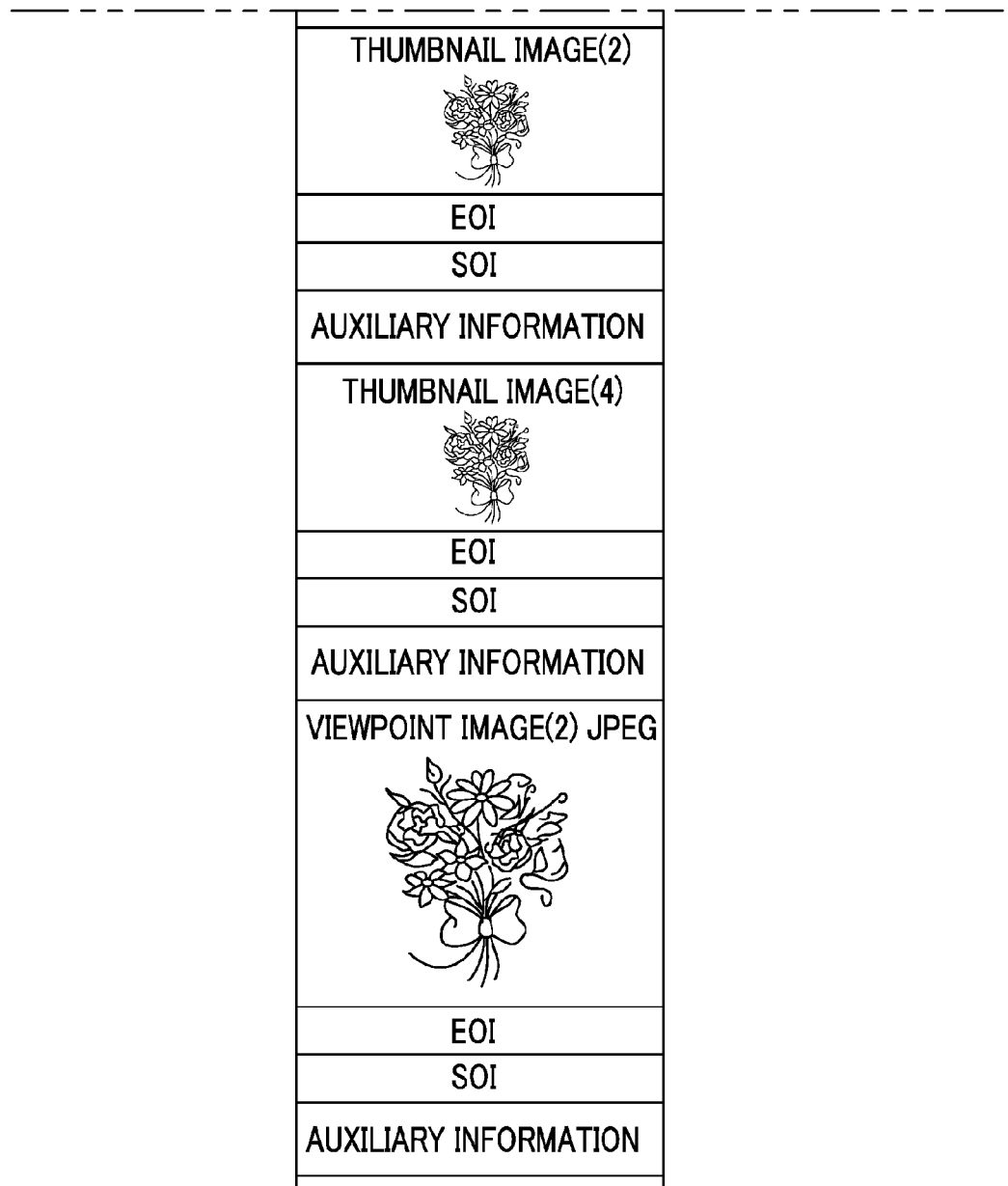

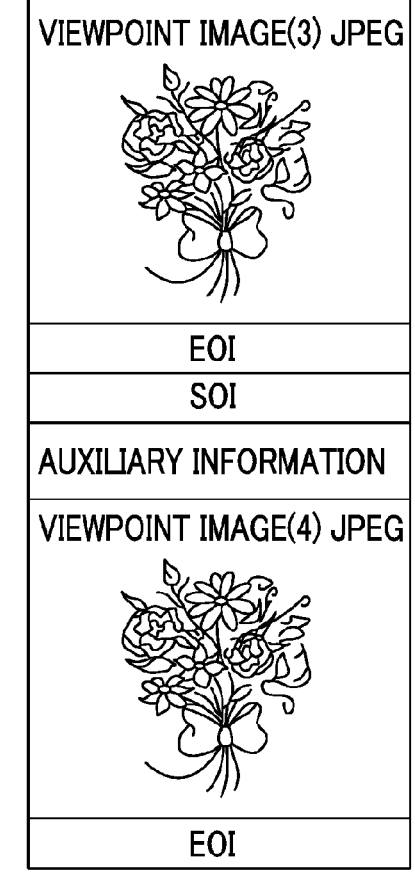

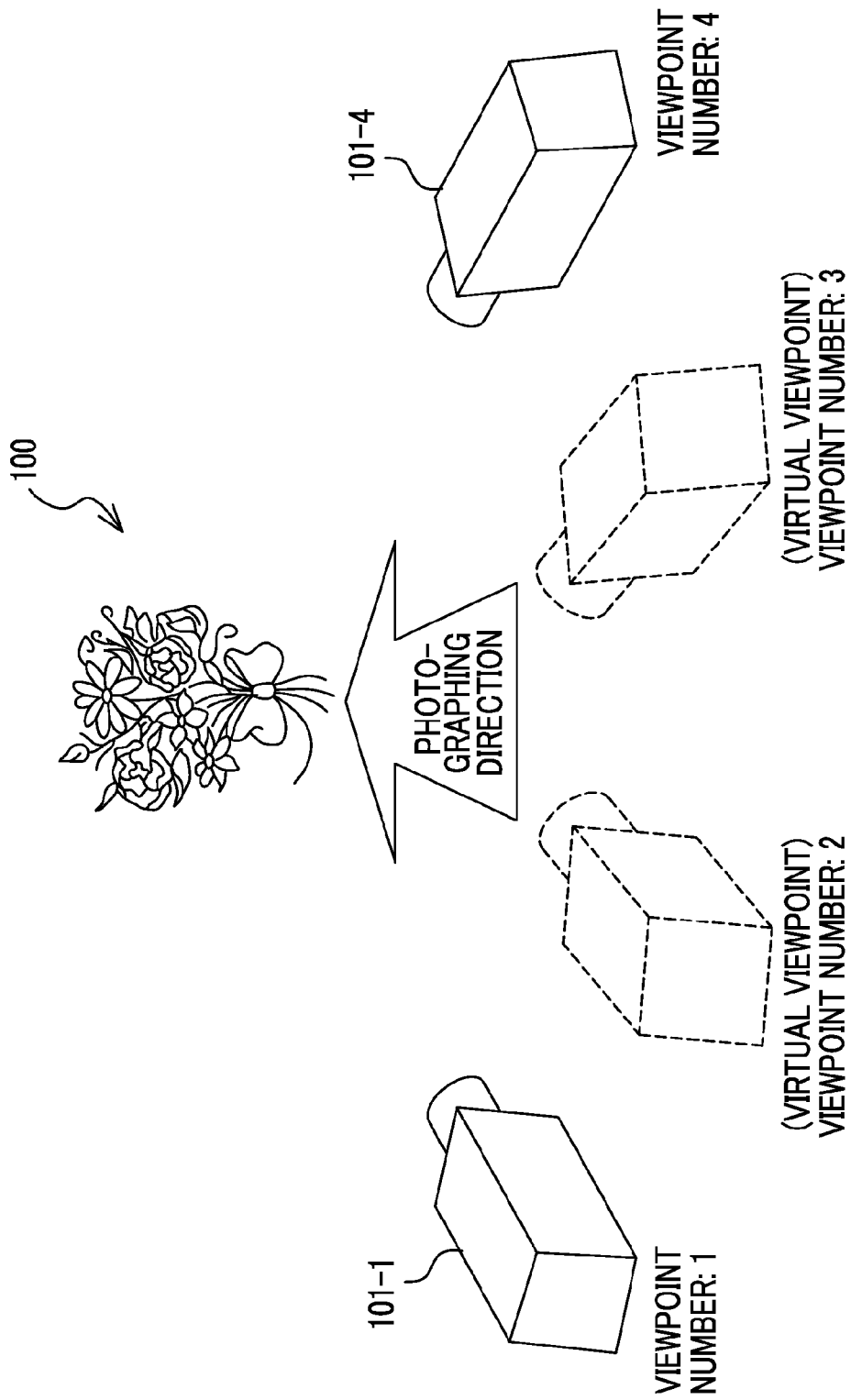

(CONT.)

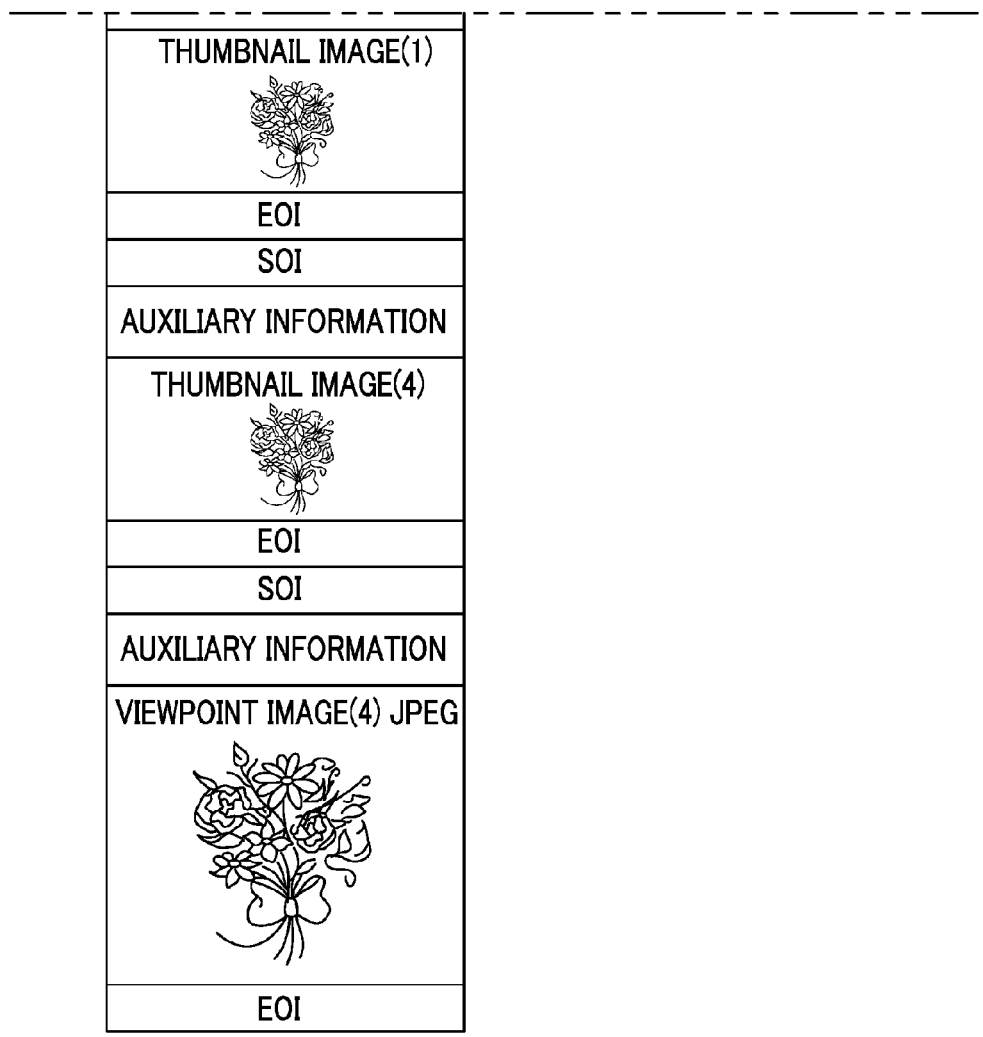

(CONT.)

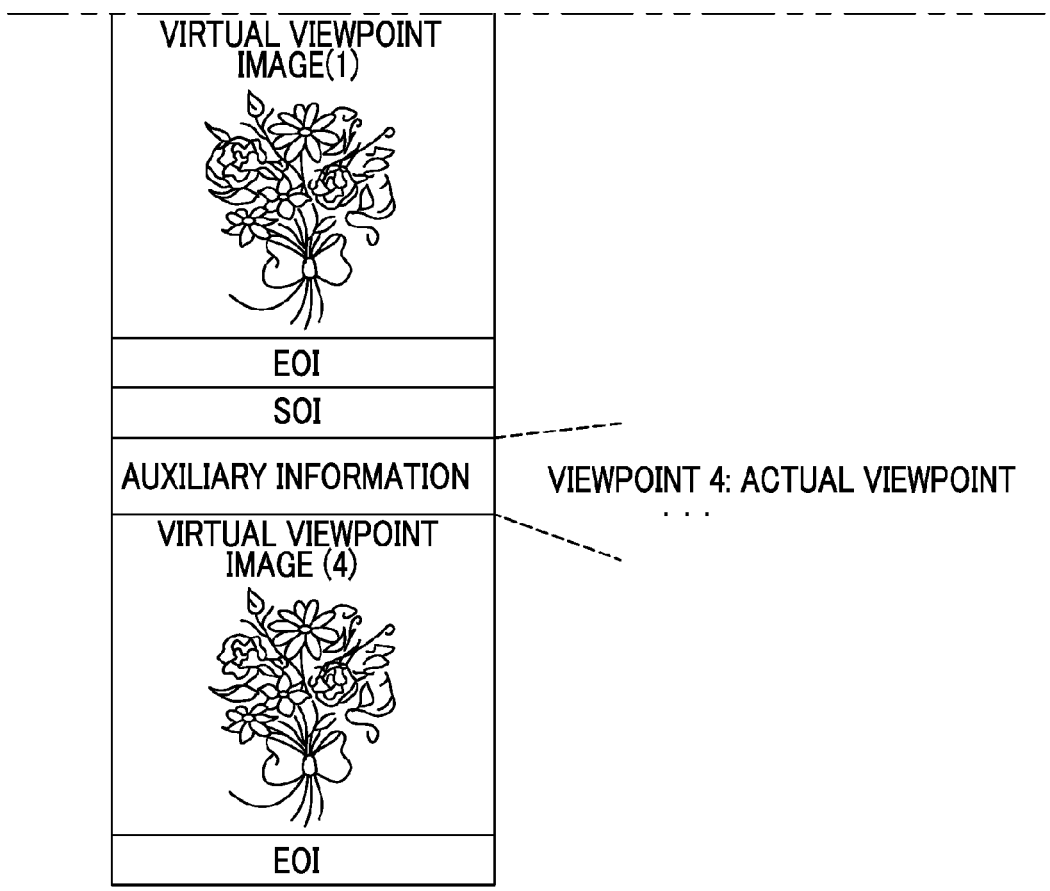

FIG. 13

| AUXILIARY INFORMATION | MAXIMUM AMOUNT OF PARALLAX |
|---|---|
| VIEWPOINT IMAGE(1)  | |
| AUXILIARY INFORMATION | VIEWPOINT 2: SHIFTED SHIFT AMOUNT=xxx |
| VIEWPOINT SHIFT IMAGE(2)  | |
| AUXILIARY INFORMATION | MAXIMUM AMOUNT OF PARALLAX |
| THUMBNAIL IMAGE(1)  | |
| AUXILIARY INFORMATION | |
| THUMBNAIL IMAGE(2)  | |
| AUXILIARY INFORMATION | MAXIMUM AMOUNT OF PARALLAX |
| ORIGINAL IMAGE (1) 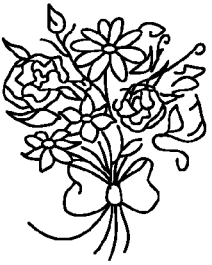 | |
| AUXILIARY INFORMATION | |
| ORIGINAL IMAGE (2) 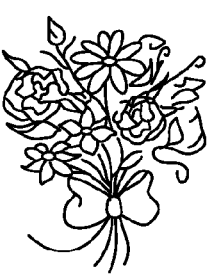 | |

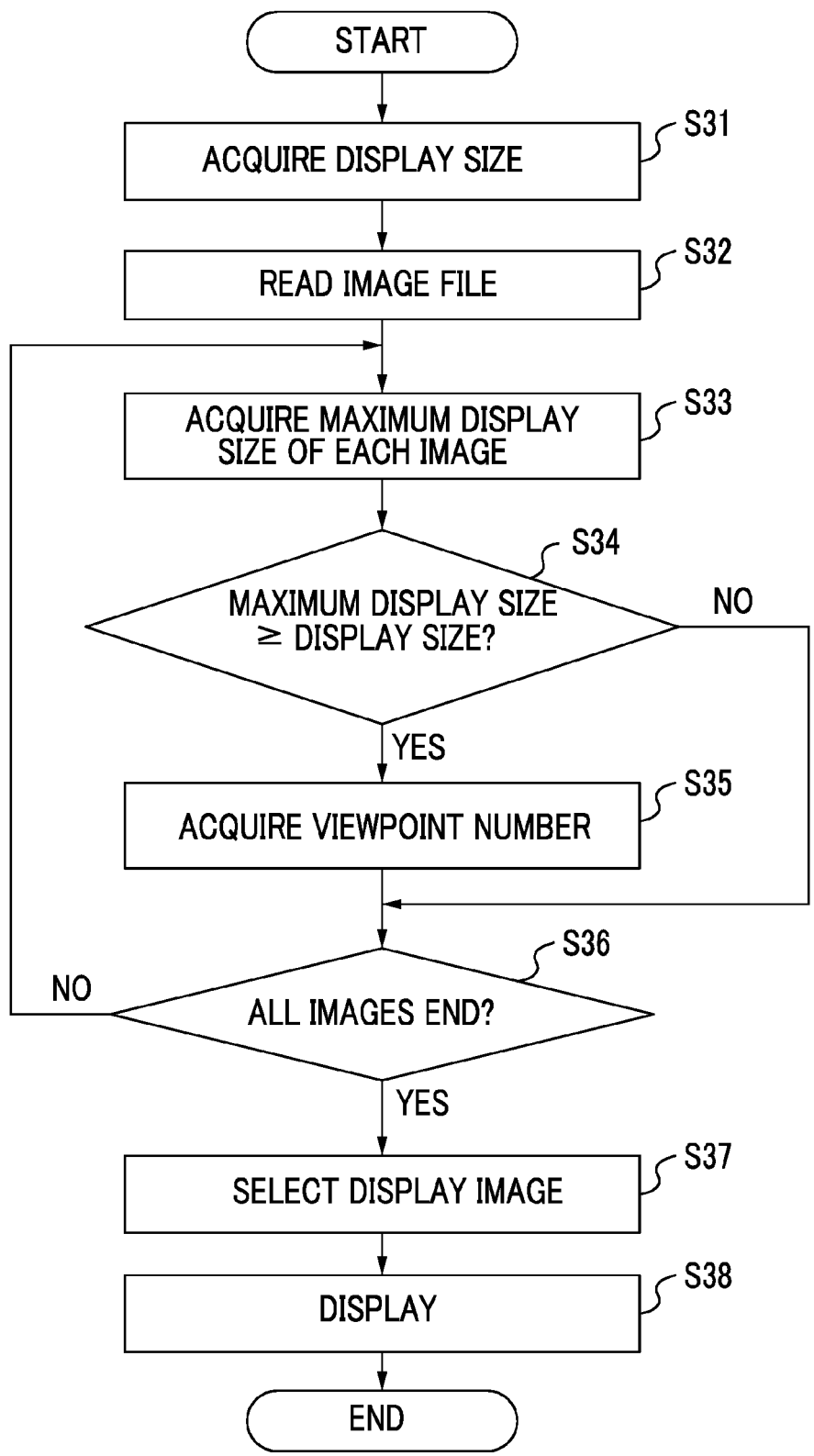

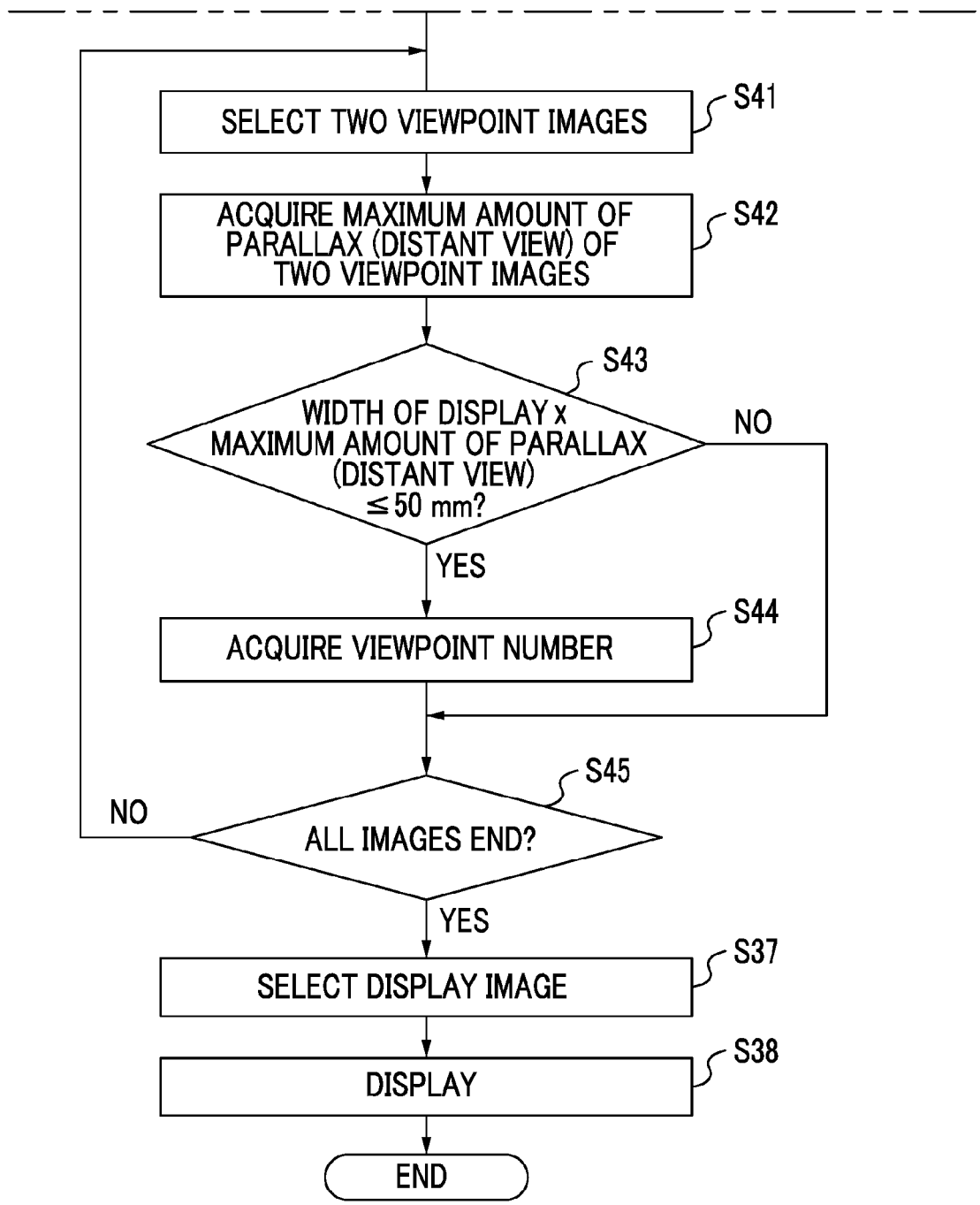

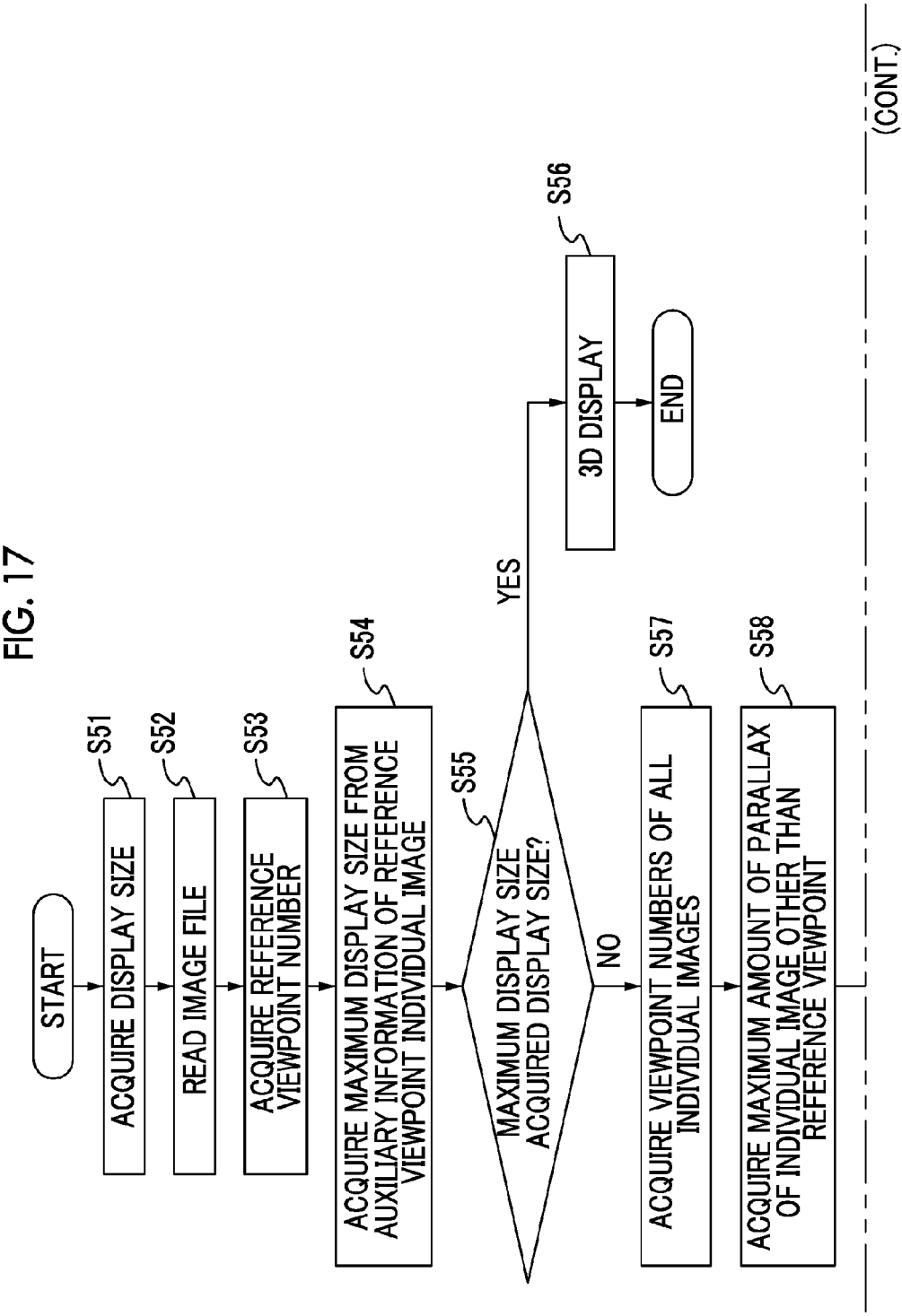

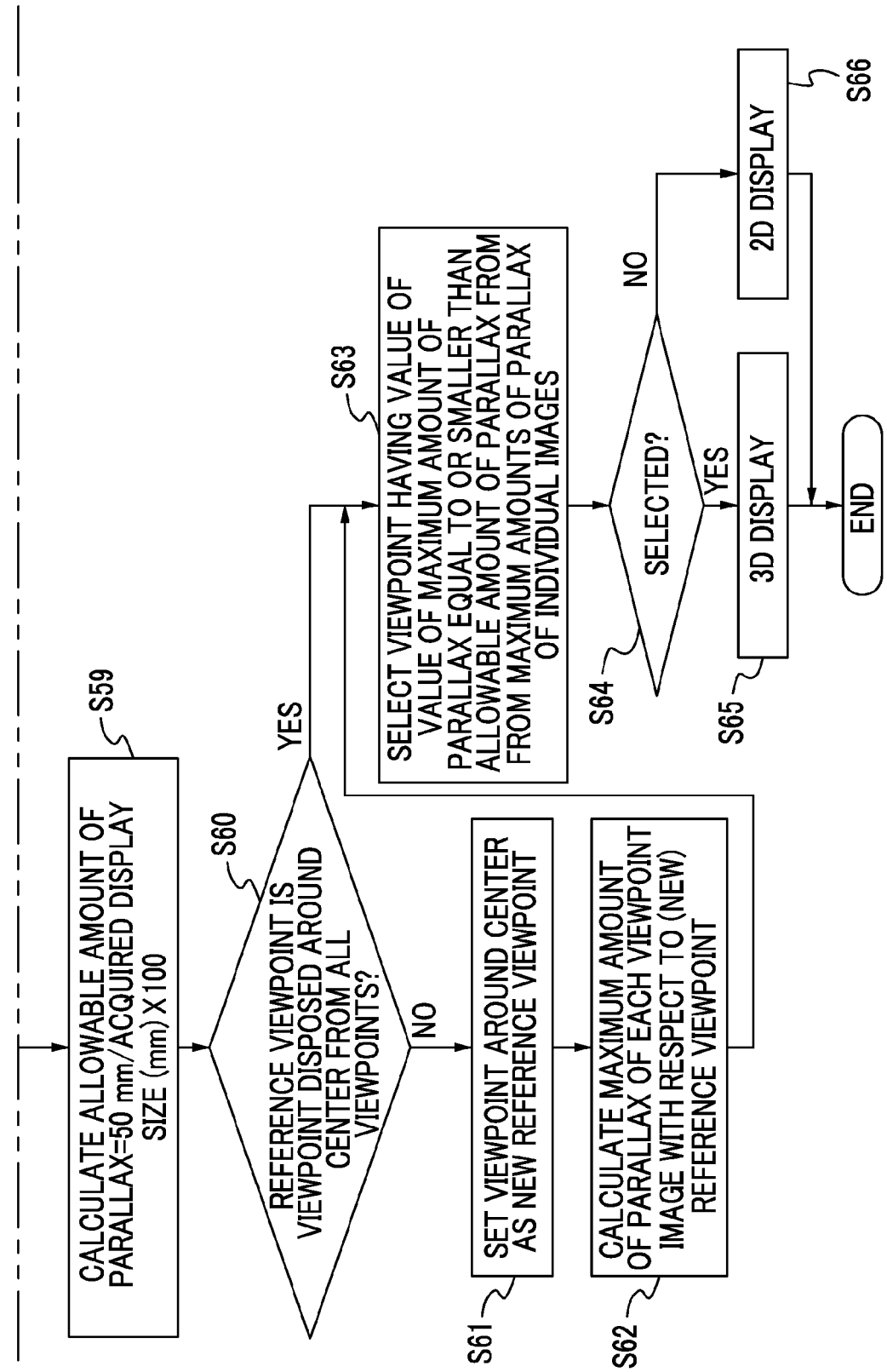

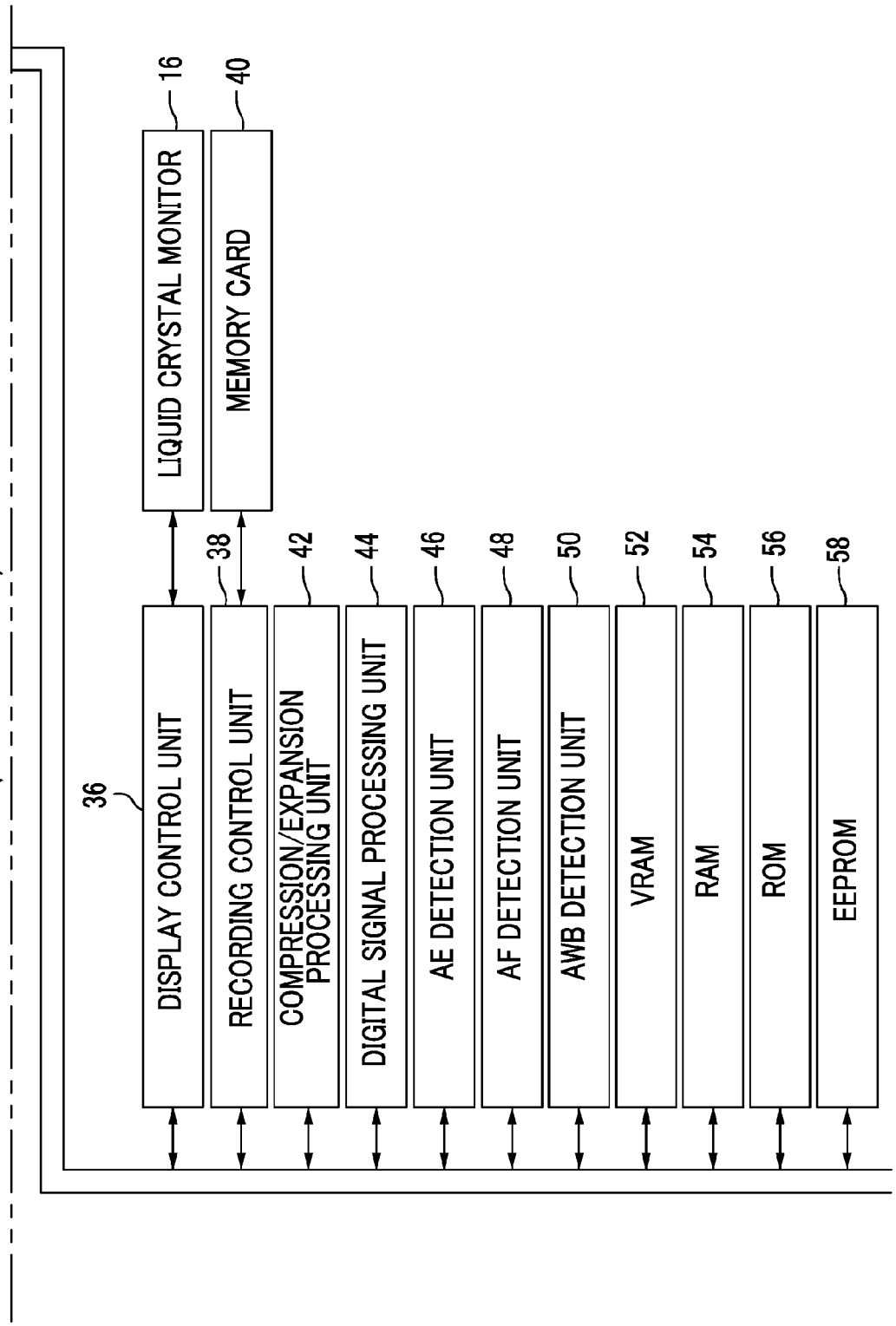

STEREOSCOPIC IMAGE REPRODUCTION DEVICE AND METHOD, STEREOSCOPIC IMAGE CAPTURING DEVICE, AND STEREOSCOPIC DISPLAY DEVICE

CROSS REFERENCE TO RELATED APPLICATIONS

This application is a Continuation of PCT International Application No. PCT/JP2011/060096 filed on Apr. 25, 2011, which claims priority under 35 U.S.C. §119(a) to Patent Application No. 2010-103906 filed in Japan on Apr. 28, 2010, all of which are hereby expressly incorporated by reference into the present application.

BACKGROUND OF THE INVENTION

1. Field of the Invention

The present invention relates to a stereoscopic image reproduction device and method, a stereoscopic image capturing device, and a stereoscopic display device, and in particular, to a technique for appropriately reproducing and displaying a stereoscopic image recorded in a three-dimensional image file.

2. Description of the Related Art

A stereoscopic image capturing device photographs the same subject from left and right viewpoints using two image capturing units (image capturing part) arranged left and right with parallax, acquires an image for a left eye and an image for a right eye, and records the images in a recording medium. The acquired left and right images are read from the recording medium, are input to a 3D display which can perform three-dimensional (3D) display, and are displayed such that the image for the left eye and the image for the right eye are visible separately with the left and right eyes. In this way, the images can be recognized as a stereoscopic image.

On the other hand, the 3D displays have various screen sizes, and the amount of parallax of the recorded left and right image may not be appropriate for the size of the 3D display on which the left and right images are reproduced and displayed. In this case, the degree of protrusion or recession becomes excessive, and there is a problem in that the images may not be recognized as a natural stereoscopic image.

In regard to this problem, in a reproduction device, an intermediate viewpoint image which should be viewed from an arbitrary viewpoint is generated from an image for a left eye and an image for a right eye. In this way, in order to generate an intermediate viewpoint image from a plurality of images of different viewpoints, it is necessary to obtain pixel correspondence between the images to estimate the depth.

However, there is a problem in that, when display is performed without causing eye fatigue (for example, parallax control), a depth range is not known. When performing such display, it is necessary to appropriately determine an observation distance along with the conditions of the viewing angle or the size of an imaging surface during photographing, the distance between the lens center and the imaging surface, and the like.

In order to solve this problem, JP2003-333621A discloses a technique in which information regarding the imaging size of a camera capturing an image and the distance between the lens center and the imaging surface is transmitted in the transmission of images of two or more viewpoints. According to this technique, information regarding the viewing angle during imaging can be obtained on the display side.

SUMMARY OF THE INVENTION

However, in the technique of JP2003-333621A, there is a problem in that processing on the display device is complicated. Furthermore, since the technique relates to data transmission, when a stereoscopic image is recorded in a recording medium, how information is recorded is not disclosed.

The invention has been accomplished in consideration of this situation, and an object of the invention is to provide a stereoscopic image reproduction device and method, a stereoscopic image capturing device, and a stereoscopic display device which display a stereoscopic image with an appropriate amount of parallax on the basis of auxiliary information recorded in a three-dimensional image file.

In order to attain the above-described object, a stereoscopic image reproduction device according to a first aspect of the invention includes first acquisition part for reading a three-dimensional image file having recorded therein N viewpoint images for stereoscopic vision of N (N: an integer equal to or greater than 3) viewpoints and auxiliary information corresponding to the N viewpoint images, the auxiliary information including the (N−1) maximum display sizes corresponding to the maximum amount of parallax on a distant view side between two viewpoint images of different combinations of a viewpoint image of a reference viewpoint set in advance from the N viewpoint images and other (N−1) viewpoint images, and the maximum display size enabling binocular fusion when the two viewpoint images are displayed on a stereoscopic display, and acquiring the N viewpoint images and auxiliary information from the three-dimensional image file, second acquisition part for acquiring the display size of the stereoscopic display as an output destination, first determination part for comparing the acquired display size of the stereoscopic display with the (N−1) maximum display sizes to determine whether or not the display size of the stereoscopic display is greater than the (N−1) maximum display sizes, selection part for selecting a set of two viewpoint images from a set or a plurality of sets of two viewpoint images corresponding to the maximum display size which is determined by the first determination part to be equal to or smaller than the display size of the stereoscopic display from the (N−1) maximum display sizes, and output part for outputting one viewpoint image from the N viewpoint images to the stereoscopic display if the first determination part determines that the display size of the stereoscopic display is greater than the (N−1) maximum display sizes and outputting the two viewpoint images selected by the selection part to the stereoscopic display if the first determination part determines that the display size of the stereoscopic display is equal to or smaller than one maximum display size from the (N−1) maximum display size. The term "distant view side" used herein refers to a distal side away from the image capturing part toward the subject, and the term "near view side" refers to a proximal side close to the image capturing part from the subject contrary to the distal side.

According to the first aspect of the invention, the N viewpoint images and the (N−1) maximum display sizes are acquired from the three-dimensional image file, and the display size of the stereoscopic display as the output destination is also acquired. The acquired display size of the stereoscopic display is compared with the (N−1) maximum display sizes, and a set of two viewpoint images is selected from a set or a plurality of sets of two viewpoint images corresponding to the maximum display size determined to be equal to or smaller than the display size of the stereoscopic display from the (N−1) maximum display sizes and output to the stereoscopic display. Therefore, a stereoscopic image with an appropriate amount of parallax can be displayed on the basis of auxiliary information recorded in a three-dimensional image file.

In order to attain the above-described object, a stereoscopic image reproduction device according to a second aspect of the invention includes first acquisition part for reading a three-dimensional image file having recorded therein N viewpoint images for stereoscopic vision of N (N: an integer equal to or greater than 3) viewpoints and auxiliary information corresponding to the N viewpoint images, the auxiliary information including the maximum amount of parallax on a distant view side between two viewpoint images of different combinations of a viewpoint image of a reference viewpoint set in advance from the N viewpoint images and other (N−1) viewpoint images and (N−1) maximum display sizes corresponding to the maximum amount of parallax on the distant view side, and the maximum display size enabling binocular fusion when the two viewpoint images are displayed on a stereoscopic display, and acquiring the N viewpoint images and auxiliary information from the three-dimensional image file, second acquisition part for acquiring the display size of the stereoscopic display as an output destination, first determination part for comparing the acquired display size of the stereoscopic display with the (N−1) maximum display sizes to determine whether or not the display size of the stereoscopic display is greater than the (N−1) maximum display sizes, extraction part for extracting a set or a plurality of sets of two viewpoint images from a plurality of (N−1) viewpoint images other than the viewpoint image of the reference viewpoint from the N viewpoint images, calculation part for calculating the maximum amount of parallax on the distant view side between a set or a plurality of sets of extracted two viewpoint images on the basis of the maximum amount of parallax on the distant view side stored corresponding to the two viewpoint images, second determination part for determining whether or not binocular fusion is enabled when two viewpoint images corresponding to the calculated maximum amount of parallax are displayed on the stereoscopic display on the basis of the calculated maximum amount of parallax, the display size of the stereoscopic display, and a predetermined value representing an interocular distance of a person, selection part for selecting a set of two viewpoint images from a set or a plurality of sets of two viewpoint images corresponding to the maximum display size determined by the first determination part to be equal to or smaller than the display size of the stereoscopic display from the (N−1) maximum display sizes and a set or a plurality of sets of two viewpoint images determined by the second determination part that binocular fusion is enabled, and output part for outputting one viewpoint image from the N viewpoint images to the stereoscopic display if the first determination part determines that the display size of the stereoscopic display is greater than the (N−1) maximum display sizes and the second determination part determines that binocular fusion is disabled, and outputting the two viewpoint images selected by the selection part to the stereoscopic display if the first determination part determines that the display size of the stereoscopic display is equal to or smaller than one maximum display size from the (N−1) maximum display sizes or if the second determination part determines that binocular fusion is enabled.

According to the second aspect of the invention, the N viewpoint images and the (N−1) maximum display sizes are acquired from the three-dimensional image file, and the display size of the stereoscopic display as the output destination is also acquired. It is determined whether or not the display size of the stereoscopic display is greater than the (N−1) maximum display sizes, and the maximum amount of parallax on the distant view side between viewpoint image of a set or a plurality of sets of two viewpoint images extracted a plurality of (N−1) viewpoint images other than the viewpoint image of the reference viewpoint from the N viewpoint images is calculated on the basis of the maximum amount of parallax on the distant view side stored corresponding to the two viewpoint images to determine whether or not binocular fusion is enabled. A set of two viewpoint images is selected from a set or a plurality of sets of two viewpoint images corresponding to the maximum display size determined to be equal to or smaller than the display size of the stereoscopic display from the (N−1) maximum display sizes and a set or a plurality of sets of two viewpoint images determined that binocular fusion is enabled, and output to the stereoscopic display. Therefore, a stereoscopic image with an appropriate amount of parallax can be displayed on the basis of auxiliary information recorded in a three-dimensional image file.

In order to attain the above-described object, a stereoscopic image reproduction device according to a third aspect of the invention includes first acquisition part for reading a three-dimensional image file having recorded therein N viewpoint images for stereoscopic vision of N (N: an integer equal to or greater than 3) viewpoints and auxiliary information corresponding to the N viewpoint images, the auxiliary information including the maximum amount of parallax on a distant view side between two viewpoint images of different combinations of a viewpoint image of a reference viewpoint set in advance from the N viewpoint images and other (N−1) viewpoint images, and acquiring the N viewpoint images and auxiliary information from the three-dimensional image file, second acquisition part for acquiring a display size of a stereoscopic display as an output destination, first determination part for determining whether or not binocular fusion is enabled when the viewpoint image of the reference viewpoint and one viewpoint image from other (N−1) viewpoint images are displayed on the stereoscopic display on the basis of the maximum amount of parallax on the distant view side recorded as the auxiliary information, the display size of the stereoscopic display, and a predetermined value representing an interocular distance of a person, extraction part for extracting a set or a plurality of sets of two viewpoint images from a plurality of (N−1) viewpoint images other than the viewpoint image of the reference viewpoint from the N viewpoint images, calculation part for calculating the maximum amount of parallax on the distant view side between a set or a plurality of sets of extracted two viewpoint images on the basis of the maximum amount of parallax on the distant view side stored corresponding to the two viewpoint images, second determination part for determining whether or not binocular fusion is enabled when two viewpoint images corresponding to the calculated maximum amount of parallax are displayed on the stereoscopic display on the basis of the calculated maximum amount of parallax, the display size of the stereoscopic display, and a predetermined value representing an interocular distance of a person, selection part for selecting a set of two viewpoint images from a set or a plurality of sets of two viewpoint images determined by at least one of the first determination part and the second determination part that binocular fusion is enabled, and output part for outputting one viewpoint image from the N viewpoint images to the stereoscopic display if the first determination part and the second determination part determine that binocular fusion is disabled and outputting the two viewpoint images selected by the selection part to the stereoscopic display if at least one of the first determination part and the second determination part determines that binocular fusion is enabled.

According to the third aspect of the invention, the N viewpoint images and the maximum amount of parallax on the distant view side of the (N−1) viewpoint images other than the viewpoint image of the reference viewpoint are acquired from the three-dimensional image file, and the display size of the stereoscopic display as the output destination is also acquired.

It is determined whether or not binocular fusion is enabled when the viewpoint image of the reference viewpoint and one viewpoint image from other (N−1) viewpoint images are displayed on the stereoscopic display, a set or a plurality of sets of two viewpoint images are extracted from a plurality of (N−1) viewpoint image other than the viewpoint image of the reference viewpoint from the N viewpoint images, and the maximum amount of parallax on the distant view side between a set or a plurality of sets of extracted two viewpoint images is calculated, it is determined whether or not binocular fusion is enabled when two viewpoint images corresponding to the calculated maximum amount of parallax are displayed on the stereoscopic display, and the two viewpoint images are output to the stereoscopic display. Therefore, a stereoscopic image with an appropriate amount of parallax can be displayed on the basis of auxiliary information recorded in a three-dimensional image file.

In the stereoscopic image reproduction device according to the second and third aspects of the invention, it is preferable that the second determination part calculates an allowable amount of parallax on the basis of the display size of the stereoscopic display and the predetermined value representing the interocular distance of the person, and determines whether or not binocular fusion is enabled in accordance with whether or not the calculated maximum amount of parallax is equal to or smaller than the allowable amount of parallax.

Accordingly, it is possible to appropriately determine whether or not binocular fusion is enabled.

In the stereoscopic image reproduction device according to the first to third aspects of the invention, the selection part preferentially selects two viewpoint images corresponding to a viewpoint image the reference viewpoint set in advance from the plurality of sets of two viewpoint images.

Accordingly, viewpoint images can be appropriately selected.

In the stereoscopic image reproduction device according to the first to third aspects of the invention, it is preferable that the selection part selects two viewpoint images having the greatest maximum amount of parallax from the plurality of sets of two viewpoint images.

Accordingly, viewpoint images can be appropriately selected.

In the stereoscopic image reproduction device of the first to third aspects of the invention, it is preferable that the selection part selects two viewpoint images having the smallest maximum amount of parallax from the plurality of sets of two viewpoint images.

Accordingly, viewpoint images can be appropriately selected.

In the stereoscopic image reproduction device according to the first to third aspects of the invention, it is preferable that the selection part preferentially selects two viewpoint images including a centermost viewpoint image in the sequence of viewpoints from the plurality of sets of two viewpoint images.

Accordingly, viewpoint images can be appropriately selected.

It is preferable that the stereoscopic image reproduction device according to the first to third aspects of the invention further includes part for acquiring the maximum amount of parallax on a near view side of the plurality of sets of two viewpoint images, wherein the selection part selects a set of two viewpoint images from the plurality of sets of two viewpoint images on the basis of the acquired maximum amount of parallax on the near view side.

Accordingly, viewpoint images can be appropriately selected.

In the stereoscopic image reproduction device according to the first to third aspects of the invention, when the N viewpoint images recorded in the three-dimensional image file include a plurality of mixed viewpoint images corresponding to an actual viewpoint and virtual viewpoint images corresponding to a virtual viewpoint generated from the plurality of viewpoint images corresponding to the actual viewpoint, the selection part preferentially selects two viewpoint images including the viewpoint image of the actual viewpoint from the plurality of sets of two viewpoint images.

Accordingly, viewpoint images can be appropriately selected.

In order to attain the above-described object, a stereoscopic image capturing device according to a fourth aspect of the invention includes image capturing part for acquiring a plurality of viewpoint images of the same subject from a plurality of viewpoints, parallax amount calculation part for calculating the amount of parallax representing the amount of deviation between feature points having common features from the plurality of acquired viewpoint images, maximum parallax amount acquisition part for acquiring the maximum amount of parallax on a distant view side from the calculated amount of parallax of each feature point, maximum display size acquisition part for acquiring the maximum display size enabling binocular fusion when the plurality of viewpoint images are displayed on a stereoscopic display on the basis of the acquired maximum amount of parallax on the distant view side, recording part for generating a three-dimensional image file in which the plurality of viewpoint images are recorded, and recording the three-dimensional image file in a recording medium, the recording part recording the plurality of viewpoint images in the three-dimensional image file and also recording the maximum amount of parallax on the distant view side and the maximum display size in the three-dimensional image file as auxiliary information, and the above-described stereoscopic image reproduction device.

Accordingly, a stereoscopic image with an appropriate amount of parallax can be displayed.

In order to attain the above-described object, a stereoscopic display device according to a fifth aspect of the invention includes a stereoscopic display as an output destination, and the stereoscopic image reproduction device according to the first to third aspects of the invention.

Accordingly, a stereoscopic image with an appropriate amount of parallax can be displayed.

In order to attain the above-described object, a stereoscopic image reproduction method according to a sixth aspect of the invention includes a first acquisition step of reading a three-dimensional image file having recorded therein N viewpoint images for stereoscopic vision of N (N: an integer equal to or greater than 3) viewpoints and auxiliary information corresponding to the N viewpoint images, the auxiliary information including the (N−1) maximum display sizes corresponding to the maximum amount of parallax on a distant view side between two viewpoint images of different combinations of a viewpoint image of a reference viewpoint set in advance from the N viewpoint images and other (N−1) viewpoint images, and the maximum display size enabling binocular fusion when the two viewpoint images are displayed on a stereoscopic display, and acquiring the N viewpoint images and auxiliary information from the three-dimensional image file, a second acquisition step of acquiring the display size of the stereoscopic display as an output destination, a first determination step of comparing the acquired display size of the stereoscopic display with the (N−1) maximum display sizes to determine whether or not the display size of the stereoscopic display is greater than the (N−1) maximum display sizes, a selection step of selecting a set of two viewpoint images from a set or a plurality of sets of two viewpoint images corresponding to the maximum display size which is determined in the first determination step to be equal to or smaller than the display size of the stereoscopic display from the (N−1) maximum display sizes, and an output step of outputting one viewpoint image from the N viewpoint images to the stereoscopic display if it is determined in the first determination step that the display size of the stereoscopic display is greater than the (N−1) maximum display sizes and outputting the two viewpoint images selected in the selection step to the stereoscopic display if it is determined in the first determination step that the display size of the stereoscopic display is equal to or smaller than one maximum display size from the (N−1) maximum display size.

In order to attain the above-described object, a stereoscopic image reproduction method according to a seventh aspect of the invention includes a first acquisition method of reading a three-dimensional image file having recorded therein N viewpoint images for stereoscopic vision of N (N: an integer equal to or greater than 3) viewpoints and auxiliary information corresponding to the N viewpoint images, the auxiliary information including the maximum amount of parallax on a distant view side between two viewpoint images of different combinations of a viewpoint image of a reference viewpoint set in advance from the N viewpoint images and other (N−1) viewpoint images and (N−1) maximum display sizes corresponding to the maximum amount of parallax on the distant view side, and the maximum display size enabling binocular fusion when the two viewpoint images are displayed on a stereoscopic display, and acquiring the N viewpoint images and auxiliary information from the three-dimensional image file, a second acquisition step of acquiring the display size of the stereoscopic display as an output destination, a first determination step of comparing the acquired display size of the stereoscopic display with the (N−1) maximum display sizes to determine whether or not the display size of the stereoscopic display is greater than the (N−1) maximum display sizes, an extraction step of extracting a set or a plurality of sets of two viewpoint images from a plurality of (N−1) viewpoint images other than the viewpoint image of the reference viewpoint from the N viewpoint images, a calculation step of calculating the maximum amount of parallax on the distant view side between a set or a plurality of sets of extracted two viewpoint images on the basis of the maximum amount of parallax on the distant view side stored corresponding to the two viewpoint images, a second determination step of determining whether or not binocular fusion is enabled when two viewpoint images corresponding to the calculated maximum amount of parallax are displayed on the stereoscopic display on the basis of the calculated maximum amount of parallax, the display size of the stereoscopic display, and a predetermined value representing an interocular distance of a person, a selection step of selecting a set of two viewpoint images from a set or a plurality of sets of two viewpoint images corresponding to the maximum display size determined in the first determination step to be equal to or smaller than the display size of the stereoscopic display from the (N−1) maximum display sizes and a set or a plurality of sets of two viewpoint images determined in the second determination step that binocular fusion is enabled, and an output step of outputting one viewpoint image from the N viewpoint images to the stereoscopic display if it is determined in the first determination step that the display size of the stereoscopic display is greater than the (N−1) maximum display sizes and it is determined in the second determination step that binocular fusion is disabled, and outputting the two viewpoint images selected in the selection step to the stereoscopic display if it is determined in the first determination step that the display size of the stereoscopic display is equal to or smaller than one maximum display size from the (N−1) maximum display sizes or if it is determined in the second determination step that binocular fusion is enabled.

In order to attain the above-described object, a stereoscopic image reproduction method according to an eighth aspect of the invention includes a first acquisition step of reading a three-dimensional image file having recorded therein N viewpoint images for stereoscopic vision of N (N: an integer equal to or greater than 3) viewpoints and auxiliary information corresponding to the N viewpoint images, the auxiliary information including the maximum amount of parallax on a near side view and the maximum amount of parallax on a distant view side between two viewpoint images of different combinations of a viewpoint image of a reference viewpoint set in advance from the N viewpoint images and other (N−1) viewpoint images, and acquiring the N viewpoint images and auxiliary information from the three-dimensional image file, a second acquisition step of acquiring the display size of the stereoscopic display as an output destination, a first determination step of determining whether or not binocular fusion is enabled when the viewpoint image of the reference viewpoint and one viewpoint image from other (N−1) viewpoint images are displayed on the stereoscopic display on the basis of the maximum amount of parallax on the distant view side recorded as the auxiliary information, the display size of the stereoscopic display, and a predetermined value representing an interocular distance of a person, an extraction step of extracting a set or a plurality of sets of two viewpoint images from a plurality of (N−1) viewpoint images other than the viewpoint image of the reference viewpoint from the N viewpoint images, a calculation step of calculating the maximum amount of parallax on the distant view side between a set or a plurality of sets of extracted two viewpoint images on the basis of the maximum amount of parallax on the distant view side stored corresponding to the two viewpoint images, a second determination step of determining whether or not binocular fusion is enabled when two viewpoint images corresponding to the calculated maximum amount of parallax are displayed on the stereoscopic display on the basis of the calculated maximum amount of parallax, the display size of the stereoscopic display, and a predetermined value representing an interocular distance of a person, a selection step of selecting a set of two viewpoint images from a set or a plurality of sets of two viewpoint images determined in at least one of the first determination step and the second determination step that binocular fusion is enabled, and an output step of outputting one viewpoint image from the N viewpoint images to the stereoscopic display if it is determined in the first determination step and the second determination step that binocular fusion is disabled and outputting the two viewpoint images selected in the selection step to the stereoscopic display if it is determined in at least one of the first determination step and the second determination step determines that binocular fusion is enabled.

According to the invention, a stereoscopic image with an appropriate amount of parallax can be displayed on the basis of auxiliary information recorded in a three-dimensional image file.

BRIEF DESCRIPTION OF THE DRAWINGS

FIG. 5 is a diagram showing a condition in which four viewpoint images are photographed.

FIGS. 7A to 7C are diagrams schematically showing another form of the data structure of a 3D image file.

FIG. 8 is a diagram illustrating a virtual viewpoint.

FIG. 13 is a diagram schematically showing the data structure of a 3D image file.

FIG. 14 is a flowchart showing reproduction and display processing.

FIG. 17 is a flowchart showing reproduction and display processing.

DESCRIPTION OF THE PREFERRED EMBODIMENTS

Hereinafter, preferred embodiments of the invention will be described with reference to the accompanying drawings.

First Embodiment

A 3D image file according to a first embodiment will be described.

Figure 1:
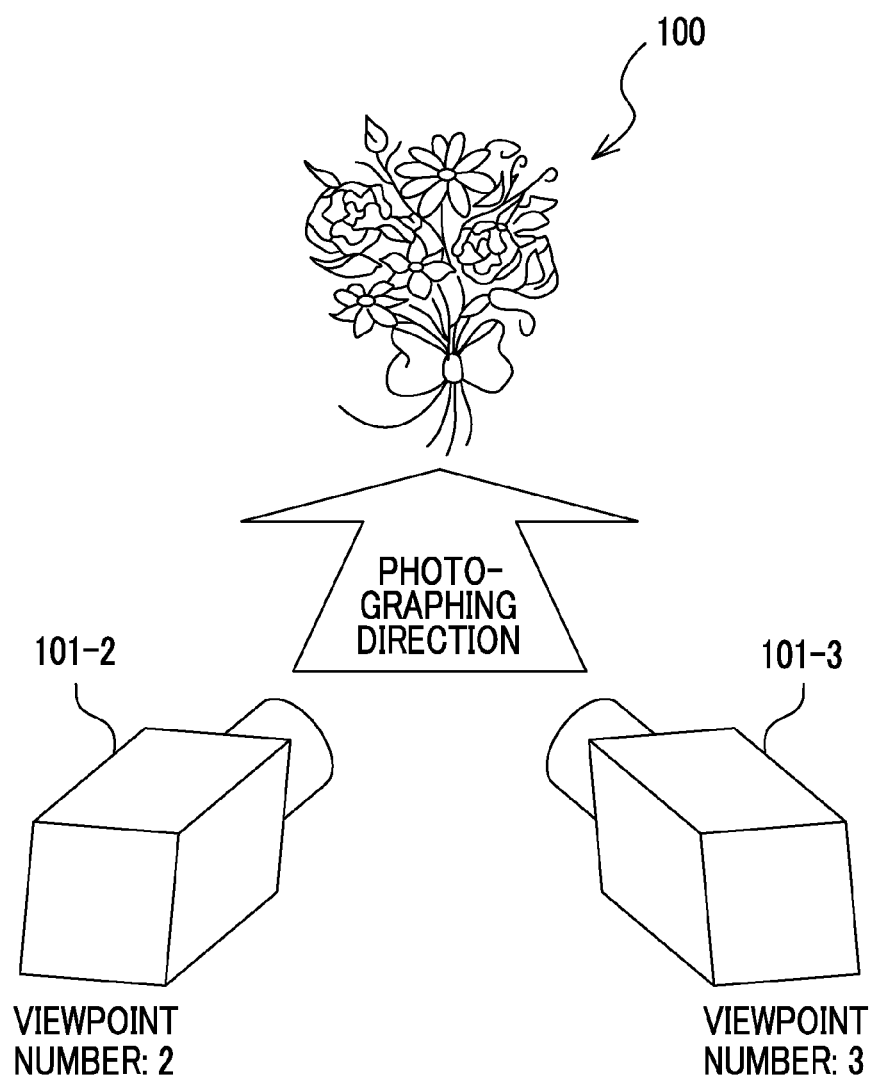
FIG. 1 is a diagram showing a condition in which two viewpoint images are photographed.
Figure 2:
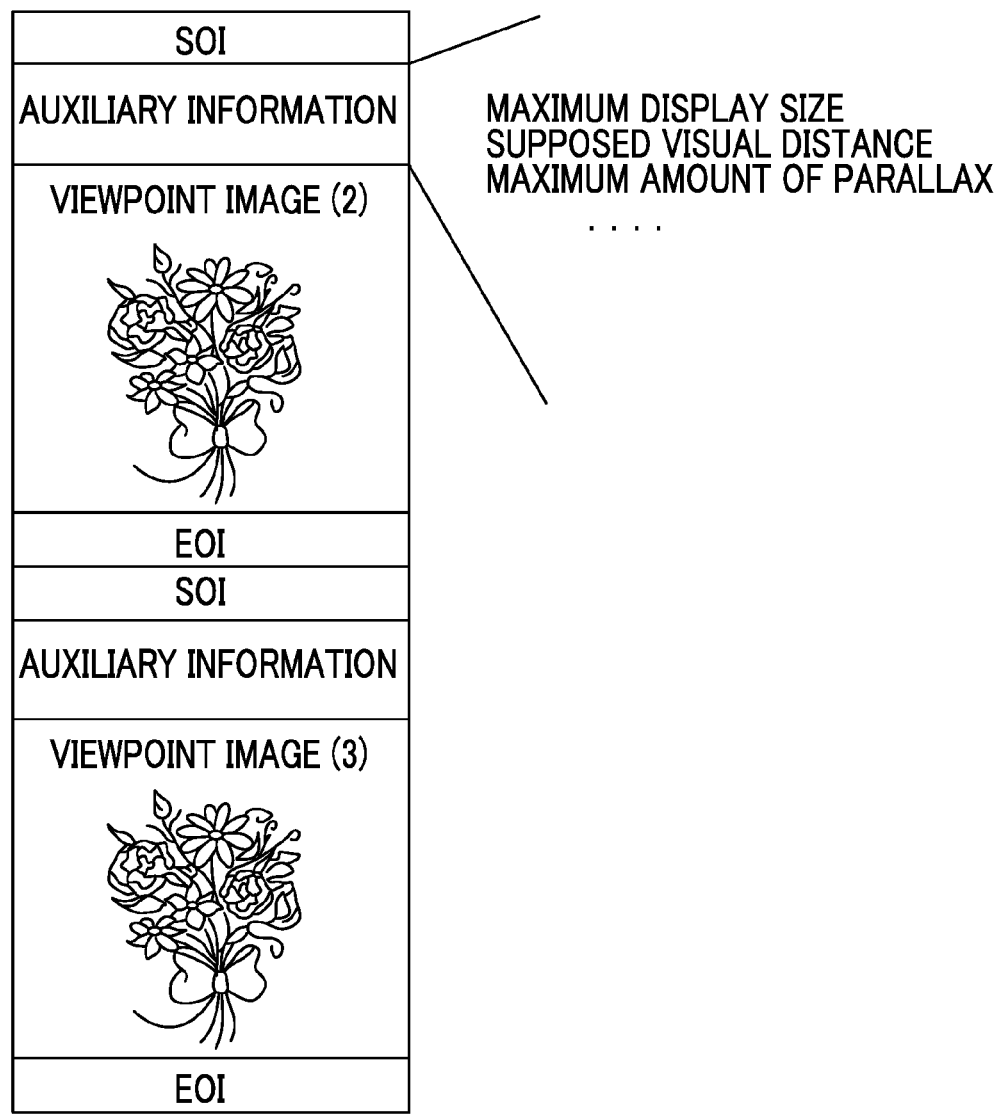
FIG. 2 is a diagram schematically showing the data structure of a 3D image file.

FIG. 1 is a diagram showing a condition in which two viewpoint images are photographed from different viewpoints with respect to a subject 100 using image capturing part of two image capturing devices 101-2 and 101-3. FIG. 2 is a diagram schematically showing the data structure of a 3D image file in which two viewpoint images 201-2 and 201-3 photographed by the image capturing part of the image capturing devices 101-2 and 101-3 shown in FIG. 1 are recorded.

The 3D image file shown in FIG. 2 is an MP file based on an MP format, and a plurality of viewpoint images of the same subjects are connected and collected in one file. In each of the connected viewpoint images, an SOI (Start of Image) marker is recorded at the top of data, and an EOI (End of Image) marker is recorded at the end of data. Accordingly, the read start position and end position of each image can be recognized.

Each piece of viewpoint image data has an image region and an auxiliary information region. In the auxiliary information region, in addition to Exif auxiliary information having photographing device information, information regarding a photographing mode, and the like, in this embodiment, auxiliary information including a maximum display size (width and height, unit: mm) acquired during image recording, a visual distance (the distance between a viewer who observes a stereoscopic image and a display) (unit: mm) supposed during image recording, a maximum amount of parallax (near view) (%), a maximum amount of parallax (distant view) (%), a convergence angle of a device photographing each viewpoint image, a base line length, an image capturing unit arrangement (viewpoint number), and the number of times of photographing when each viewpoint image is acquired is recorded. The auxiliary information is acquired using first acquisition part (first acquisition step). The first acquisition part reads a three-dimensional image file having recorded therein N viewpoint images for stereoscopic vision of N (N: an integer equal to or greater than 3) viewpoints and auxiliary information corresponding to the N viewpoint images, the auxiliary information including (N−1) maximum display sizes corresponding to the maximum amount of parallax on a distant view side between two viewpoint images of different combinations of a viewpoint image of a reference viewpoint set in advance from the N viewpoint images and other (N−1) viewpoint images, the maximum display size enabling binocular fusion when the two viewpoint images are displayed on a stereoscopic display, and acquires the N viewpoint images and auxiliary information from the three-dimensional image file.

Figure 3:
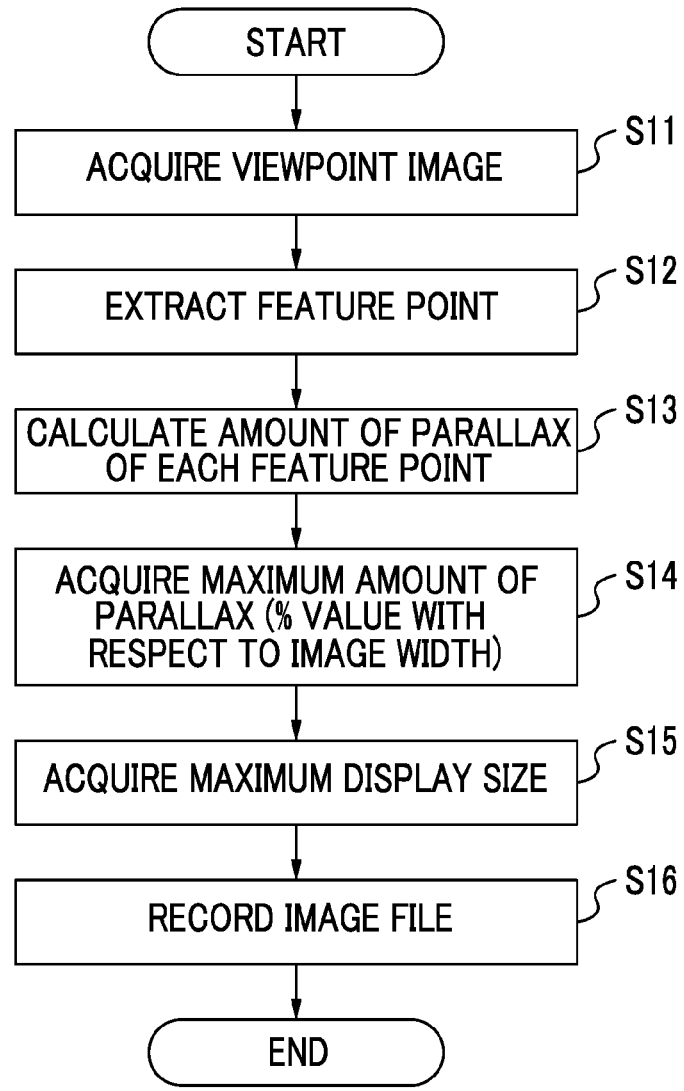
FIG. 3 is a flowchart showing photographing and recording processing.

Photographing and recording processing for recording such a 3D image file will be described with reference to the flowchart of FIG. 3.

First, a plurality of viewpoint images are acquired (Step S11). Here, as shown in FIG. 1, photographing is performed using the two image capturing devices 101-2 and 101-3 one by one with respect to the subject 100 to acquire the two viewpoint images 201-2 and 201-3. Note that the image capturing device 101-2 has a viewpoint number 2, and the image capturing device 101-3 has a viewpoint number 3.

Next, a plurality of feature points are extracted from the two viewpoint images 201-2 and 201-3 using parallax amount calculation part (Step S12), and the amount of parallax of each feature point is calculated (Step S13). Here, the amount of parallax indicates the difference in the distance from the left end of each viewpoint image of the corresponding feature points between the viewpoint images, and the unit is pixel. The maximum amount of parallax on the distant view side and the maximum amount of parallax on the near view side are acquired from the calculated amount of parallax of each feature point using maximum parallax amount acquisition part (Step S14).

Figure 4A:
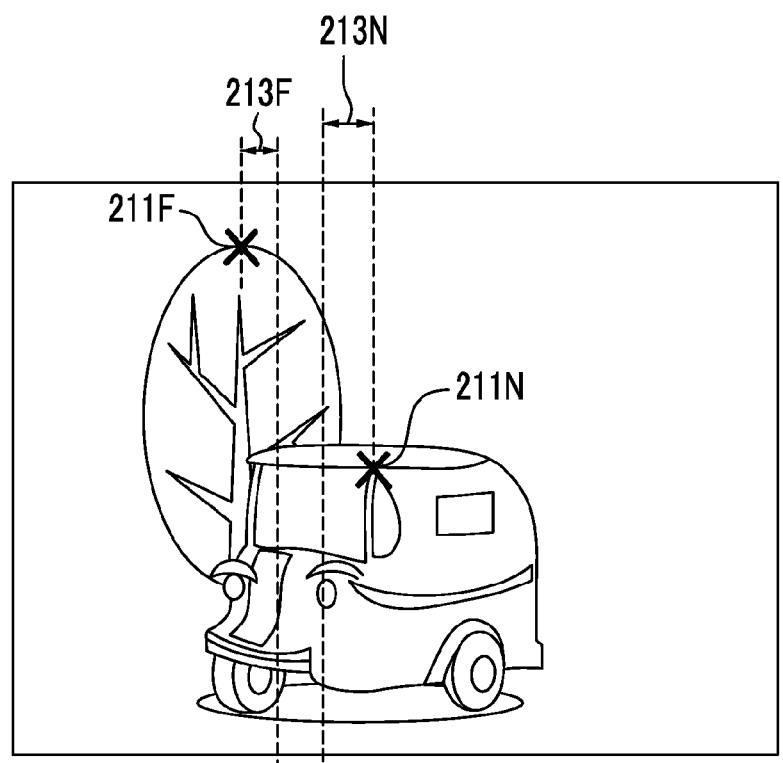
FIGS. 4A and 4B are diagrams showing an example of two viewpoint images.
Figure 4B:
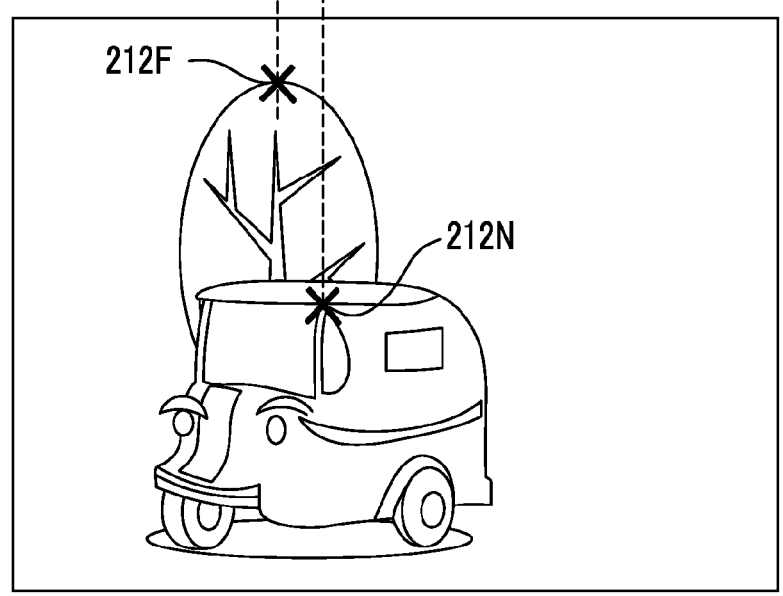

FIGS. 4A and 4B are diagrams showing an example of two viewpoint images. FIG. 4A shows a left viewpoint image 201-2, and FIG. 4B shows a right viewpoint image 201-3.

In the example of FIGS. 4A and 4B, the maximum amount of parallax on the near view side is 213N, and the feature point (the position of the maximum amount of parallax (near view)) having this amount of parallax is 211N and 212N. The maximum amount of parallax on the distant view side is 213F, and the feature point (the position of the maximum amount of parallax (distant view)) having this amount of parallax is 211F and 212F. That is, when stereoscopic vision of a stereoscopic image based on the two viewpoint images 201-2 and 201-3 is achieved, the position of the maximum amount of parallax (near view) is viewed most closely, and the position of the maximum amount of parallax (distant view) is viewed most distantly.

The ratios (%) of the maximum amount of parallax 213N on the near view side and the maximum amount of parallax 213F on the distant view side with respect to the image width become a maximum amount of parallax (near view) (%) and a maximum amount of parallax (distant view) (%).

The maximum display size is acquired on the basis of the calculated maximum amount of parallax using the maximum display size acquisition part (Step S15). If the amount of parallax on the distant view side exceeds the interocular distance of a person, binocular fusion is disabled at the position of the image, and stereoscopic vision cannot be achieved. Accordingly, the maximum display size of which parallax does not exceed the interocular distance of the person is acquired from the ratio (%) of the maximum amount of parallax (distant view) with respect to the image width calculated in Step S14.

For example, if it is assumed that the interocular distance of the person is 50 mm, and the ratio of the maximum amount of parallax (distant view) with respect to the image width is 10%, the maximum display width which is allowed for stereoscopic vision becomes 500 mm. That is, in the case of a display having a width equal to or smaller than 500 mm, display is performed such that the amount of parallax of the maximum parallax position (distant view) does not exceed the interocular distance 50 mm, and as a result, the viewer can view stereoscopic vision. When a display having an aspect ratio of 16:9 is assumed, the maximum display height becomes 281.25 mm.

The interocular distance of the person may be determined appropriately for the intended viewer. For example, when only an adult is intended, the value of a wide width of 65 mm or the like may be set.

For example, if it is assumed that the interocular distance of the person is 65 mm, and the ratio of the maximum amount of parallax (distant view) with respect to the image width is 15%, the maximum display width which is allowed for stereoscopic vision becomes about 433 mm. When a display having an aspect ratio of 16:9 is assumed, the maximum display height becomes about 244 mm.

Instead of calculation using the interocular distance of the person, a table in which the maximum display size corresponding to the maximum amount of parallax is recorded may be prepared in advance, and the maximum display size may be acquired with reference to the table.

Finally, as shown in FIG. 2, the two viewpoint images 201-2 and 201-3 and the auxiliary information are recorded as one 3D image file using recording part (Step S16).

That is, subsequent to the SOI marker for the viewpoint image 201-2, the maximum display size acquired in Step S15, the supposed visual distance, the maximum amount of parallax (near view) (%) and the maximum amount of parallax (distant view) (%) acquired in Step S14, the convergence angle of the image capturing devices 101-2 and 101-3 in Step S11, the base line length, the viewpoint number, and the number of times of photographing are recorded to be included in the auxiliary information. Thereafter, image information of the viewpoint image 201-2 and the EOI marker are recorded.

The SOI marker, the auxiliary information, the image information, and the EOI marker of the viewpoint image 201-3 are recorded. In the auxiliary information region of the viewpoint image 201-3, only Exif auxiliary information may be recorded.

As described above, the 3D image file shown in FIG. 2 can be recorded.

The 3D image file recorded in this way is read by a reproduction device when being displayed on a 3D display. At this time, in the reproduction device, the maximum display size recorded in the auxiliary information of the 3D image file is compared with the display size of the 3D display for display, thereby easily determining whether or not stereoscopic vision is possible. Accordingly, when it is determined that stereoscopic vision is possible, the recorded image may be displayed directly, and processing for adjusting the amount of parallax can be reduced depending on the screen size in the reproduction device.

When it is necessary to adjust the amount of parallax in the reproduction device, the amount of parallax can be appropriately adjusted using information regarding the supposed visual distance or the number of times of photographing recorded in the auxiliary information.

Although in this embodiment, the maximum display size is determined on the basis of only the maximum amount of parallax on the distant view side, the maximum display size may be determined taking into consideration the maximum amount of parallax on the near view side. Taking into consideration the maximum amount of parallax on the near view side, the maximum display size capable of appropriately achieving stereoscopic vision on the near view side as well as the distant view side can be determined.

Second Embodiment

Although in the first embodiment, an example where two viewpoint images are photographed from two viewpoints has been described, the number of viewpoints of a stereoscopic image according to the invention is not limited to two, and multi-viewpoint images may be used.

FIG. 5 is a diagram showing a condition in which four viewpoint images are photographed from different viewpoints with respect to the subject 100 using four image capturing devices 101-1 to 101-4. It is assumed that the viewpoint numbers of the image capturing devices 101-1 to 101-4 are 1 to 4 in order.

Figure 6:
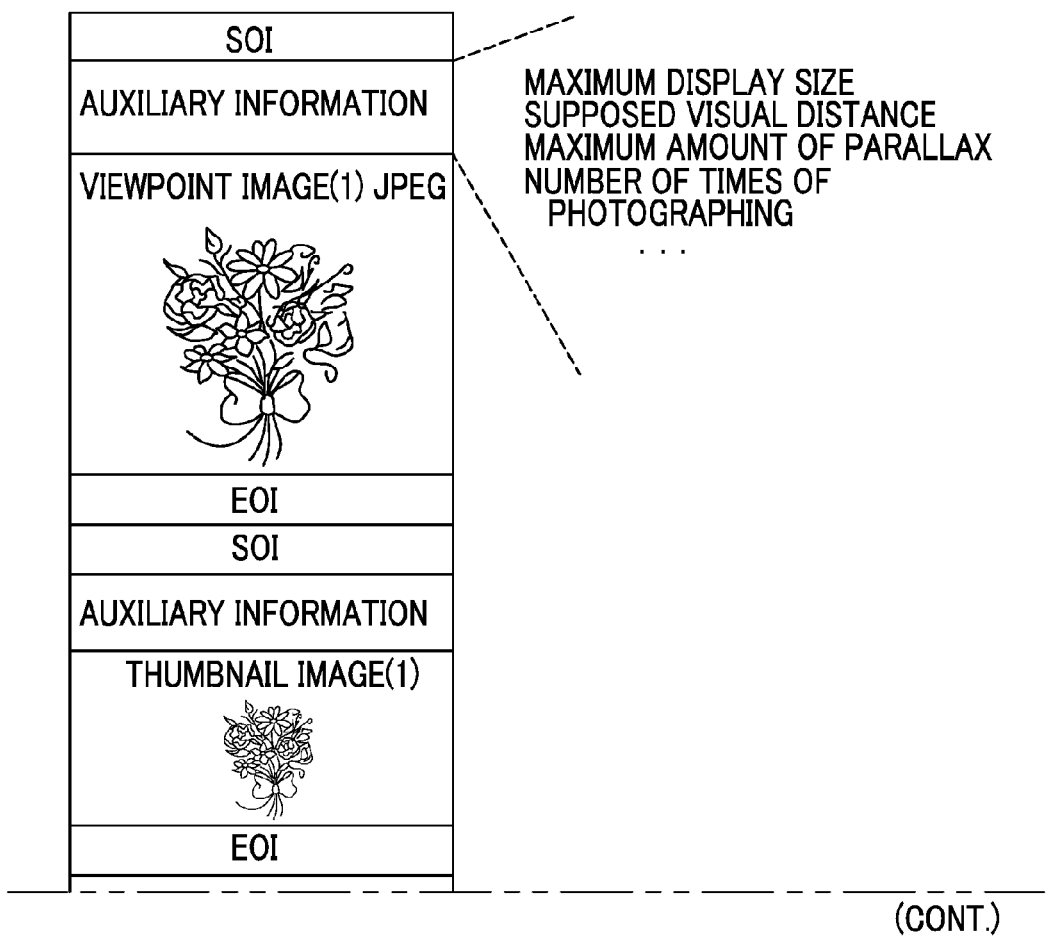
FIG. 6 is a diagram schematically showing the data structure of a 3D image file.

FIG. 6 is a diagram schematically showing the data structure of a 3D image file in which four viewpoint images photographed by the four image capturing devices 101-1 to 101-4 are recorded. In the 3D image file, in addition to the four viewpoint images, an image for display obtained by reducing the size of each viewpoint image is recorded. As an image for display, a full HD image having resolution of 1920×1080 is used.

As shown in FIG. 6, these images are recorded in order of a viewpoint image (hereinafter, called a viewpoint image (1)) of a viewpoint number 1, an image (hereinafter, called a thumbnail image (1)) for display of the viewpoint number 1, a viewpoint image (hereinafter, called a viewpoint image (2)) of a viewpoint number 2, an image (hereinafter, called a thumbnail image (2)) for display of the viewpoint number 2, a viewpoint image (hereinafter, called a viewpoint image (3)) of a viewpoint number 3, an image (hereinafter, called a thumbnail image (3)) for display of the viewpoint number 3, a viewpoint image (hereinafter, called a viewpoint image (4)) of a viewpoint number 4, and an image (hereinafter, called a thumbnail image (4)) for display of the viewpoint number 4.

First, the viewpoint image (1) photographed with the viewpoint number 1 as a reference viewpoint is recorded as a head image, and the recording region has an SOI marker, auxiliary information region, an image information region, and an EOI marker.

In the auxiliary information region, as in the first embodiment, in addition to Exif auxiliary information having photographing device information, information regarding a photographing mode, and the like, auxiliary information including a maximum display size, a supposed visual distance, a maximum amount of parallax (near view), a maximum amount of parallax (distant view), a convergence angle of a device photographing each viewpoint image, a base line length, an image capturing unit arrangement (viewpoint number), the number of times of photographing when each viewpoint image is acquired, and the like is recorded.

In regard to the maximum display size, the maximum amount of parallax, and the like, the values where the entire 3D image file is used are recorded. Specifically, the maximum amount of parallax calculated from a viewpoint image (in this case, the viewpoint image (4)) with the greatest amount of parallax on the basis of the viewpoint image (1) photographed with the reference viewpoint, and the maximum display size acquired from the maximum amount of parallax are recorded. In regard the convergence angle, the base line length, and the like, the convergence angle and the base line length to a device photographing the same viewpoint image (in this case, the viewpoint image (4)) are recorded.

In the image information region, image information of the viewpoint image (1) is recorded, and the EOI marker is subsequently recorded.

Subsequently to the viewpoint image (1), the thumbnail image (1) generated from the viewpoint image (1) is recorded, and as before, the recording region has an SOI marker, an auxiliary information region, an image information region, and an EOI marker. In the auxiliary information region, normal Exif auxiliary information is recorded.

Subsequently to the thumbnail image (1), the viewpoint image (2) is recorded. The recording region of the viewpoint image (2) also has an SOI marker, an auxiliary information region, an image information region, and an EOI marker.

In the auxiliary information region, in addition to normal Exif auxiliary information, auxiliary information including a maximum display size calculated from the viewpoint image (2) and the viewpoint image (1) photographed with the reference viewpoint, a supposed visual distance, a maximum amount of parallax (near view), a maximum amount of parallax (distant view), a convergence angle of a device photographing two viewpoint images, a base line length, a viewpoint number, the number of times of photographing of two viewpoint images, and the like is included and recorded.

Subsequently to the viewpoint image (2), the thumbnail image (2) generated from the viewpoint image (2) is recorded, and thereafter, the viewpoint image (3) is recorded.

The recording region of the viewpoint image (3) also has an SOT marker, an auxiliary information region, an image information region, and an EOI marker. In the auxiliary information region, in addition to normal Exif auxiliary information, the maximum display size calculated from the viewpoint image (3) and the viewpoint image (1) photographed with the reference viewpoint, and the like are recorded in the same way.

Hereinafter, in regard to the viewpoint image (4), the same is recorded.

In this way, when recording multi-viewpoint images, it is preferable that the maximum display size as auxiliary information of each viewpoint image in the relation with the head image is recorded.

The 3D image file recorded in this way is read by the reproduction device when being displayed on the 3D display. At this time, in the reproduction device, the maximum display size of each viewpoint image recorded in the auxiliary information of the 3D image file is compared with the display size of the 3D display for display, thereby appropriately and easily determining whether or not stereoscopic vision is possible.

The recording order of multi-viewpoint images is not limited to the order shown in FIG. 6.

For example, as shown in FIG. 7A, the viewpoint image (1), the thumbnail image (1) to the thumbnail image (4), and the viewpoint image (2) to the viewpoint image (4) may be recorded in this order. If the thumbnail images for display are recorded earlier, image reading during file reading when display is performed can be quickened, and a required time until images are displayed on the 3D display can be reduced. Each viewpoint image is primarily used for printing, and since printing requires a predetermined time, even when viewpoint image is recorded in the second half portion of the file, there is little adverse effect.

Figure 7B:
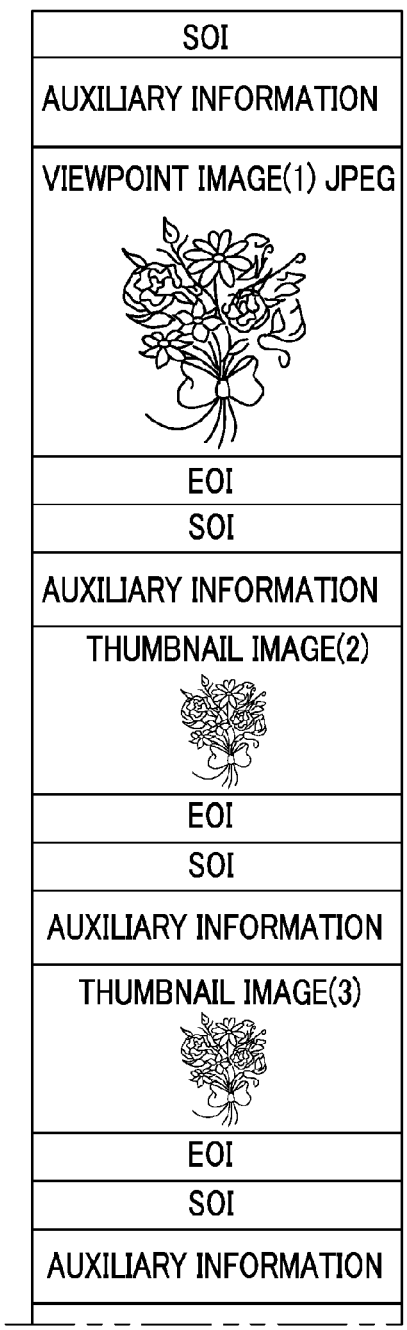

The recording order of the thumbnail images may be set such that recommended images when being displayed on the 3D display are recorded earlier. For example, if stereoscopic display using the thumbnail image (2) and the thumbnail image (3) is recommended, as shown in FIG. 7B, the thumbnail image (2) and the thumbnail image (3) may be recorded next to the viewpoint image (1) as the head image, and thereafter, the thumbnail image (1) and the thumbnail image (4) may be recorded.

When the amount of parallax of two images is small, even in a large display, display can be performed such that stereoscopic vision is possible. An image with a viewpoint close to the center is used appropriately for stereoscopic vision. Accordingly, in such a case, saying images in the viewpoint number 2 and the viewpoint number 3 are recommended, it is preferable the thumbnail image (2) and the thumbnail image (3) are recorded earlier.

Similarly, if stereoscopic display using the thumbnail image (1) and the thumbnail image (3) is recommended, as shown in FIG. 7C, the thumbnail image (1) and the thumbnail image (3) may be recorded next to the viewpoint image (1) as the head image, and thereafter, the thumbnail image (2) and the thumbnail image (4) may be recorded.

When there are recommended images during stereoscopic display, the maximum display size, supposed visual distance, and the maximum amount of parallax in the recommended images may be recorded in the auxiliary information of the viewpoint image (1) as the head image.

Third Embodiment

All multi-viewpoint images in the second embodiment may not be images which are actually photographed, and may include virtual viewpoint images corresponding to virtual viewpoints.

For example, as shown in FIG. 8, two viewpoint images are photographed from different viewpoints (viewpoint number 1 and viewpoint number 4) with respect to the subject 100 using two image capturing devices 101-1 and 101-4. A viewpoint image 2 and a viewpoint image 3 of a viewpoint number 2 and a viewpoint number 3 with virtual viewpoints which are different from a viewpoint number 1 and a viewpoint number 4 and not actually present may be generated. When generating virtual viewpoint images, there is a method of internally dividing each pixel of a plurality of photographed images, a method of generating virtual viewpoint images using a parallax map generated from a plurality of photographed images and one photographed image, or the like, the method is not particularly limited.

Figure 9A:
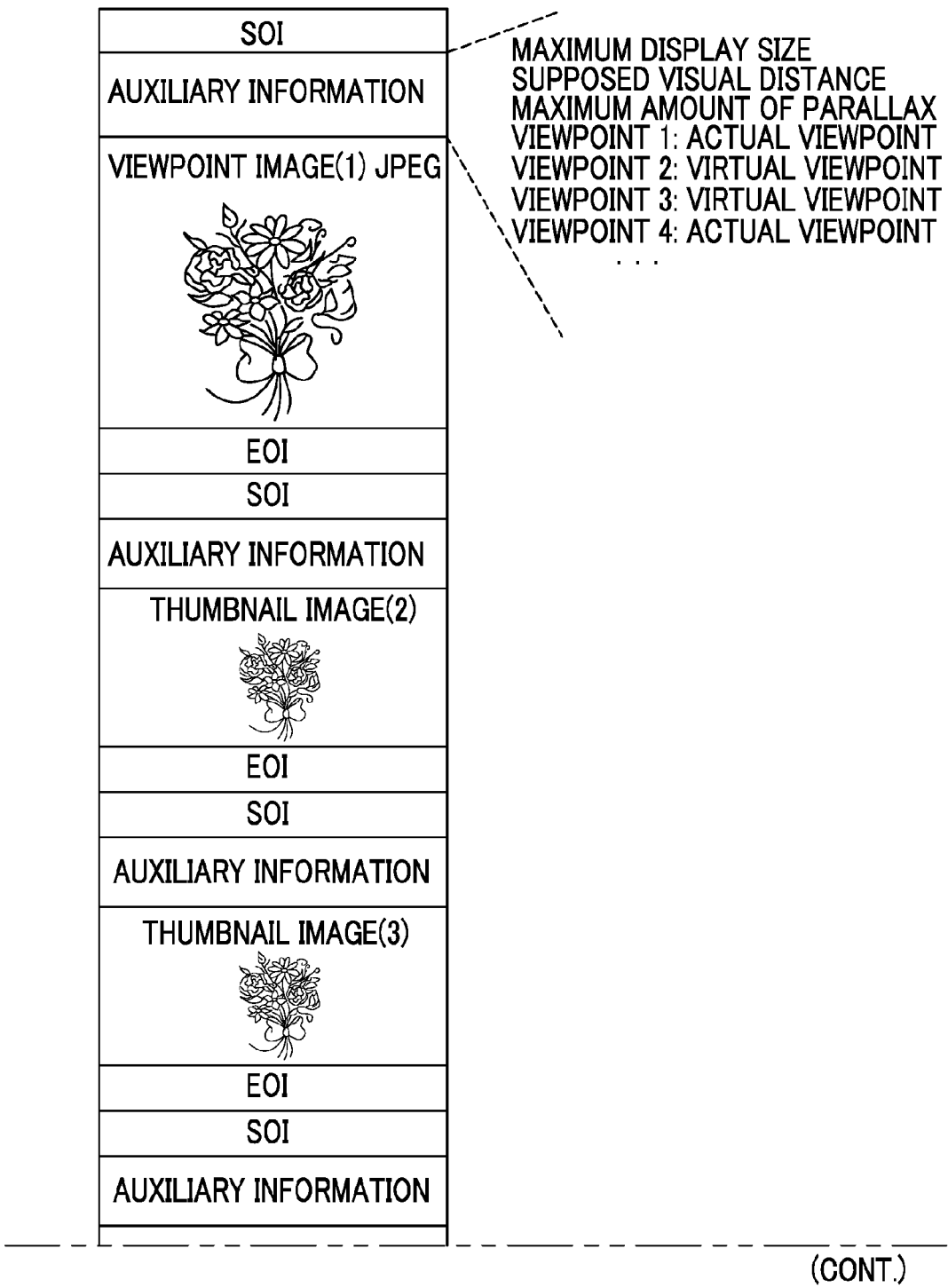
FIGS. 9A and 9B are diagrams schematically showing the data structure of a 3D image file.

FIG. 9A is a diagram schematically showing the data structure of a 3D image file in which the viewpoint images acquired in this way are recorded. In the example of FIG. 9A, two viewpoint images (1) and (4) actually photographed, thumbnail images (1) and (4) as images for display of the viewpoint images, and thumbnail image (2) and (3) as images for display of the virtual viewpoint images are recorded.

First, the viewpoint image (1) is recorded as a head image, then, the thumbnail image (2), the thumbnail image (3), the thumbnail image (1), and the thumbnail image (4) are recorded, and subsequently, the viewpoint image (4) is recorded. Here, the thumbnail images may be recorded in a recommendation order, may be recorded in an arrangement order of viewpoints, or may be recorded in order from the centermost viewpoint. The thumbnail image (2) and the thumbnail image (3) may be generated from the thumbnail image (1) and the thumbnail image (4), or may be generated from the viewpoint image (1) and the viewpoint image (4).

As before, the recording region of each image has an SOI marker, an auxiliary information region, an image information region, and an EOI marker. In the auxiliary information region of the viewpoint image (1), in addition to a maximum display size, a supposed visual distance, and a maximum amount of parallax, viewpoint information representing whether each viewpoint number is a viewpoint (actual viewpoint) with which photographing is actually performed or a virtual viewpoint is recorded.

Figure 9B:
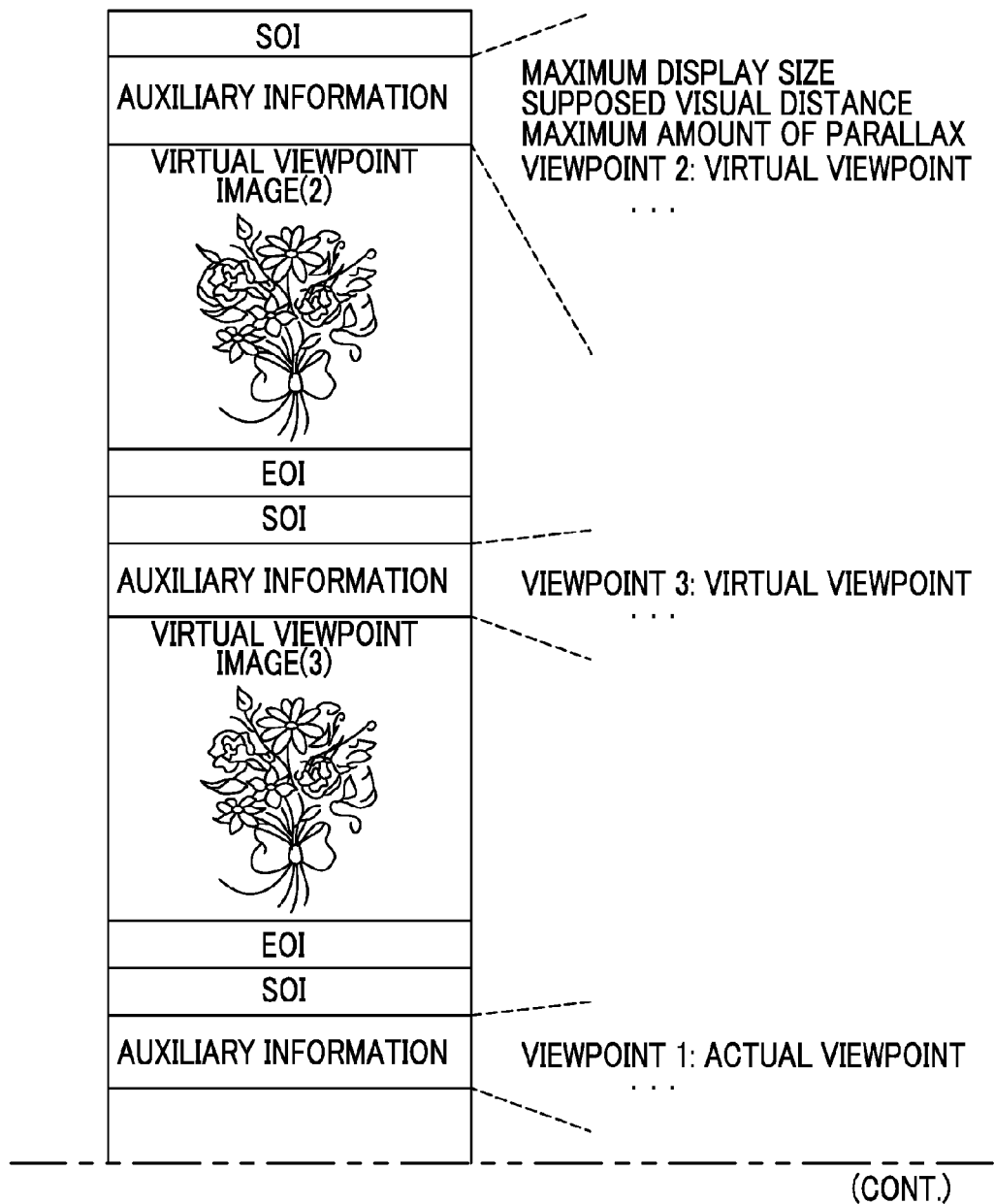

Images for display may not be provided, and only viewpoint images for printing may be recorded. In the example shown in FIG. 9B, two viewpoint images (1) and (4) actually photographed and viewpoint images (2) and (3) which are virtual viewpoint images are recorded.

The recording order may be a recommendation order of printing or display. Specifically, the viewpoint image (2) is recorded as a head image, and subsequently, the viewpoint image (3), the viewpoint image (1), and the viewpoint image (4) are recorded. As before, the viewpoint images may be recorded in an order of viewpoints.

In this way, if virtual viewpoint images are generated and recorded, it should suffice that there are two images as actual viewpoint images, making it possible to simplify and lighten an image capturing optical system of an image capturing device.

Fourth Embodiment

When being displayed on a display of a supposed size, if it is determined that the amount of parallax on the distant view side exceeds the interocular distance of the person, recording may be performed after the amount of parallax of images is adjusted such that stereoscopic vision is possible even when the images are displayed on the display of this size.

In this embodiment, parallax displacement is performed as the adjustment of the amount of parallax.

Figure 10:
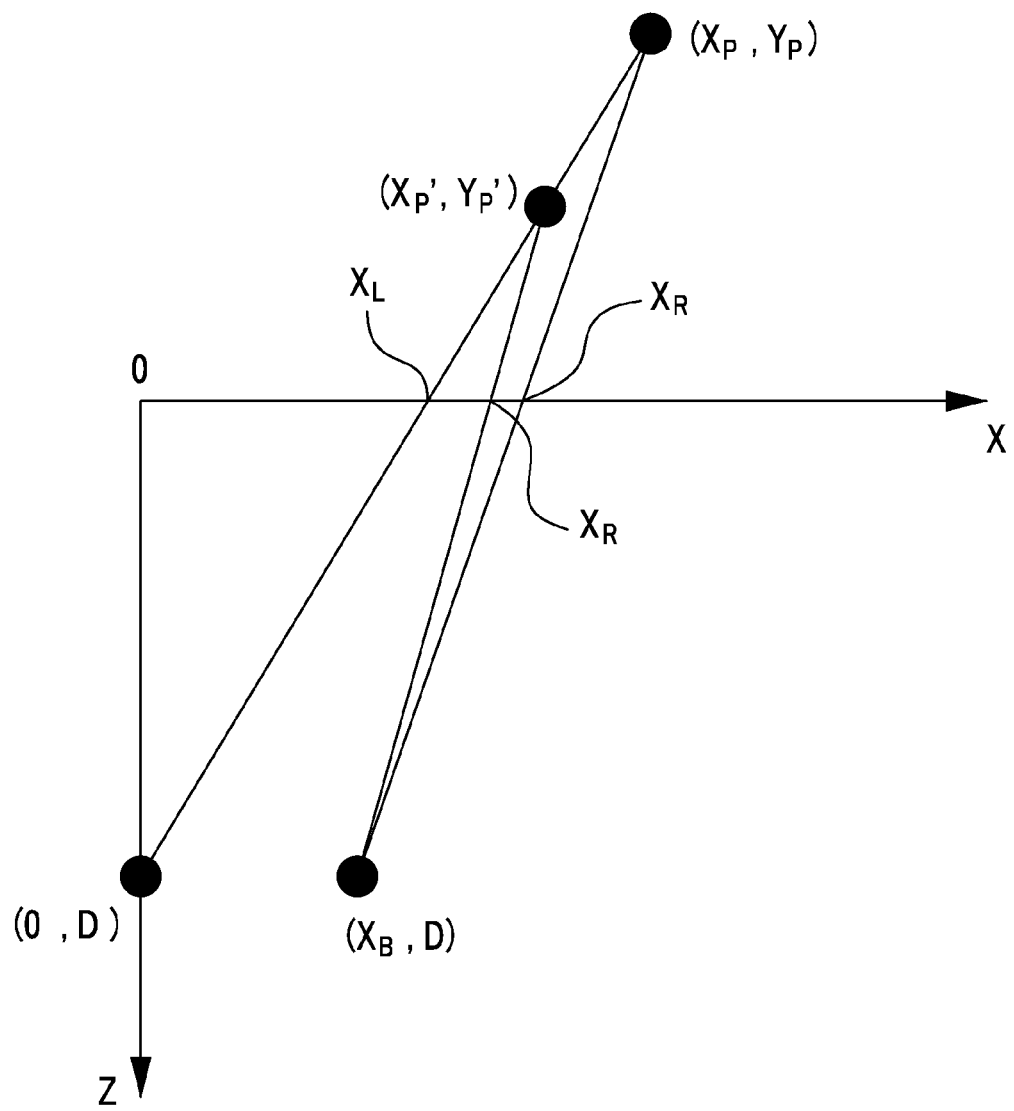
FIG. 10 is a diagram illustrating the principle of parallax displacement.
Figure 11:
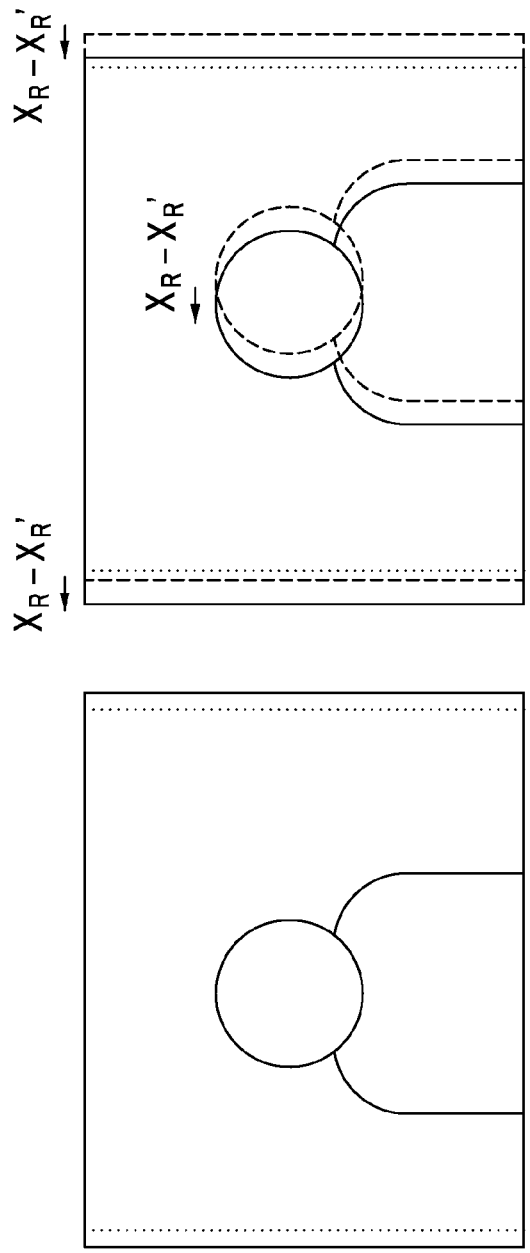
FIGS. 11A and 11B are diagrams showing left and right viewpoint images and parallax displacement.

FIG. 10 is a diagram illustrating the principle of parallax displacement. FIG. 11A is a diagram showing a left viewpoint image, and FIG. 11B is a diagram showing a right viewpoint image. Here, it is assumed that the left eye of the viewer is at the coordinates (0,D), and the right eye of the viewer is at the coordinates $(X_B,D)$. In the left and right viewpoint images displayed on Z=0, the subject displayed at the coordinates $(X_L,0)$ of the left viewpoint image and the coordinates $(X_R,0)$ of the right viewpoint image is viewed at the coordinates $(X_P,Y_P)$.

In this state, as shown in FIG. 11B, if the right viewpoint image is shifted by $X_R-X_R'$ in the left direction, as shown in FIG. 10, the coordinates of the right viewpoint image of the subject become $(X_R',0)$, and as a result, the subject is viewed at the coordinates $(X_P',Y_P')$.

In this way, if parallax displacement is performed, the adjustment of the amount of parallax can be performed. Accordingly, if parallax displacement is performed when the amount of parallax on the distant view side exceeds the interocular distance of the person, the amount of parallax can fall within the interocular distance of the person, making it possible to appropriately perform stereoscopic vision.

Figure 12:
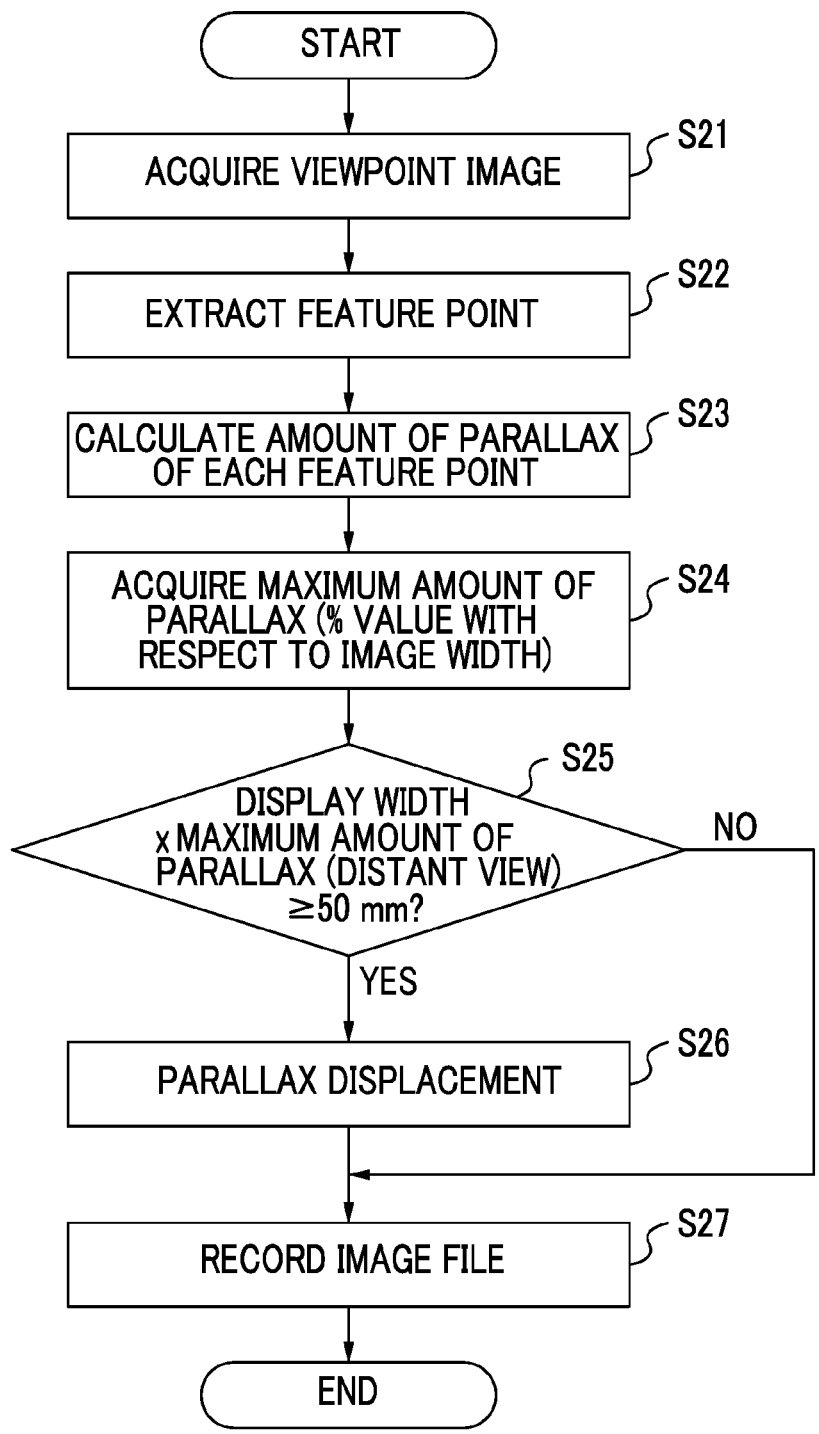
FIG. 12 is a flowchart showing photographing and recording processing.

FIG. 12 is a flowchart showing a photographing and recording principle for recording a 3D image file according to this embodiment.

First, a plurality of viewpoint images are acquired (Step S21). Here, it is assumed that two viewpoint images are photographed. Next, a plurality of feature points are extracted from each two viewpoint images (Step S22), and the amount of parallax of each feature point is calculated (Step S23). The maximum amount of parallax on the near view side and the maximum amount of parallax on the distant view side are acquired from the calculated amount of parallax of each feature point (Step S24).

Here, for a supposed display on which display is performed, the display width is acquired. The display width of the supposed display may be determined in advance and stored, or when a 3D display is connected through an external connection terminal, such as an HDMI terminal, the size of the 3D display may be read through communication based on the connection.

When the stereoscopic image is displayed on the display having this display width, it is determined whether or not the maximum parallax position on the distant view side can be stereoscopically viewed (Step S25). Specifically, the product of the display width and the maximum amount of parallax (%) on the distant view side is calculated, and it is determined whether or not the calculated product is equal to or greater than the interocular distance of the person, 50 mm.

When the calculated product is smaller than 50 mm, the two photographed viewpoint images are recorded directly (Step S27). For example, the viewpoint images may be recorded as the 3D image file having the data structure shown in FIG. 2, or the thumbnail images for display or virtual viewpoint images may be generated and recorded.

When the calculated product is equal to or greater than 50 mm, parallax displacement is performed such that the product becomes smaller than 50 mm and the maximum parallax position on the distant view side can be stereoscopically viewed (Step S26).

As shown in FIGS. 11A and 11B, parallax displacement may be performed by displacing the right viewpoint image in the left direction, or may be performed by displacing the left viewpoint image in the right direction. The left and right viewpoint images may be displaced in a direction in which the images are brought close to each other.

After the parallax displacement processing ends, recording is performed (Step S27). FIG. 13 is a diagram schematically showing the data structure of a 3D image file to be recorded. In the 3D image file, in addition to two photographed original images, images for display and thumbnail images obtained by reducing the size of the original images after parallax displacement are recorded. Here, the images for display are images of full HD size, and the thumbnail images are images of VGA size. The thumbnail images are used, for example, when being displayed for image search on a small liquid crystal display provided on the rear surface of the image capturing device.

As shown in FIG. 13, these images are recorded in order of the image for display of the viewpoint number 1, the image for display of the viewpoint number 2, the thumbnail image of the viewpoint number 1, the thumbnail image of the viewpoint number 2, the original image of the viewpoint number 1, and the original image of the viewpoint number 2, and the recording region of each image has an SOI marker (not shown in the drawing), an auxiliary information region, an image information region, and an EOI marker (not shown in the drawing).

First, the image for display of the viewpoint number 1 as the reference viewpoint is recorded as a head image, and in the auxiliary information region, the maximum amount of parallax is recorded.

The image for display of the viewpoint number 2 is next recorded, and this image is an image after parallax displacement is performed. In the auxiliary information region of the image for display of the viewpoint number 2, information indicating that the parallax displacement processing is completed and the shift amount (unit: pixel) are recorded.

Subsequently, the thumbnail image of the viewpoint number 1 is recorded, and in the auxiliary information region thereof, the maximum amount of parallax is recorded.

The thumbnail image of the viewpoint number 2 is further recorded. The thumbnail image may be an image after parallax displacement, or may be an image generated from the original image of the viewpoint number 2.

Thereafter, the original image of the viewpoint number 1 and the original image of the viewpoint number 2 are recorded. In the auxiliary information region of the original image of the viewpoint number 1, the maximum amount of parallax is recorded.

With this 3D image file, when being displayed on a display of supposed size, the maximum parallax position on the distant view side can be constantly stereoscopically viewed, and thus, the viewer can appropriately view stereoscopic vision.

Since the thumbnail images of VGA size are also recorded, this is effective for display during image search.

The supposed display size may be recorded in the auxiliary information region of the head image. If the supposed display size is recorded, in the reproduction device, the read supposed display size is compared with the display size of the 3D display for display, thereby appropriately and easily determining whether or not stereoscopic vision is possible.

Fifth Embodiment

Next, processing for reading, reproducing, and displaying the 3D image file recorded in this way will be described with reference to the flowchart of FIG. 14.

It is assumed that the format of the 3D image file to be read in this embodiment is the same as the 3D image file shown in FIG. 6, and the maximum display size, the supposed visual distance, and the maximum amount of parallax (distant view) recorded in the auxiliary information of each viewpoint image are as shown in Table 1. It is assumed that the viewpoint position of each image and the viewpoint number has the relation shown in FIG. 5, and the reference viewpoint is the viewpoint number 1.

TABLE 1

| | Viewpoint Number | Maximum DSP Size | Supposed Visual Distance | Maximum Amount of Parallax (Distant View) |
|---|---|---|---|---|
| Viewpoint Image (1) | 1 | 500 mm | 2000 mm | 10% |
| Viewpoint Image (2) | 2 | 1200 mm | 4000 mm | 4% |
| Viewpoint Image (3) | 3 | 700 mm | 2500 mm | 7% |
| Viewpoint Image (4) | 4 | 500 mm | 2000 mm | 10% |

Initially, the size (lateral width) of a display on which a 3D image is now displayed is acquired using second acquisition part (Step S31: second acquisition step). Here, it is assumed that the acquired lateral width of the display is 600 mm. The 3D image file shown in FIG. 6 is read (Step S32).

Next, the maximum display size is acquired in an order of the viewpoint numbers from the read 3D image file (Step S33). In the example shown in Table 1, first, the maximum display size of the viewpoint image (1) as the viewpoint number 1, 500 mm, is acquired.

Next, it is determined using first determination part whether or not the acquired maximum display size is equal to or greater than the display size acquired in Step S31 (Step S34: first determination step). Here, while the maximum display size is 500 mm, the display size is 600 mm, and thus the process progresses to Step S36.

In Step S36, it is determined whether or not the acquisition of the maximum display size ends for all images.

Here, since the acquisition of the maximum display size does not end for all images, the process returns to Step S33.

In Step S33, the viewpoint number is incremented by 1, and then, the maximum display size of the viewpoint image (2) as the viewpoint number 2, 1200 mm, is acquired.

Next, the process progresses to Step S34, and it is determined whether or not the acquired maximum display size is equal to or greater than the display size. This time, since the maximum display size is 1200 mm and equal to or greater than the display size of 600 mm, the process progresses to Step S35. In Step S35, the current viewpoint number is acquired. Here, the viewpoint number 2 is acquired.

In this way, the processing from Step S33 to Step S35 is repeated for all images. With this processing, only viewpoint numbers of images in which the maximum display size is equal to or greater than the display size are acquired. Here, the viewpoint number 2 and the viewpoint number 3 are acquired.

Next, a display image is selected from the images of the acquired viewpoint numbers acquired in Step S35 using selection part (Step S37). Here, the viewpoint image (1) as the image of the reference viewpoint and one of the image (viewpoint image (2)) of the viewpoint number 2 and the image (viewpoint image (3)) of the viewpoint number 3 are selected (selection step).

As a reference for selection, an image with the greatest amount of parallax, an image with the smallest amount of parallax, an image close to the center viewpoint, or the like is considered. An actual viewpoint image actually photographed may be preferentially selected over an image of a virtual viewpoint. This reference may be determined in advance, or may be freely set by the viewer. Here, it is assumed that an image with the greatest amount of parallax is selected, and as a result, the viewpoint image (1) and the viewpoint image (3) are selected.

The image selected in Step S37 is 3D-displayed on the 3D display through output part (Step S38: output step). That is, here, 3D display is performed on the basis of the viewpoint image (1) and the viewpoint image (3). At this time, 3D display may be performed using the thumbnail images for display of the viewpoint images. When no viewpoint number is acquired in Step S35, that is, when the maximum display size of all images is smaller than the display size, 2D display is performed. The reference for selection of images to be 2D-displayed may be appropriately determined.

In this way, the maximum display size recorded as the auxiliary information of each viewpoint image obtained by the first acquisition part (step) is read and compared with the display size of which display is actually performed, and an image whose maximum display size is great is selected and displayed, making it possible to constantly display an appropriate 3D image.

Such processing may be performed on the basis of the maximum amount of parallax recorded in the auxiliary information of each viewpoint image of the 3D image file and obtained by calculation part (step). Alternatively, a set or a plurality of sets of two viewpoint images are extracted from a plurality of (N−1) viewpoint images other than the viewpoint image of the reference viewpoint from the N viewpoint images using extraction part, and the maximum amount of parallax on the distant view side between a set or a plurality of sets of two viewpoint images extracted using the calculation part may be calculated on the basis of the maximum amount of parallax on the distant view side stored corresponding to the two viewpoint images.

Figure 15:
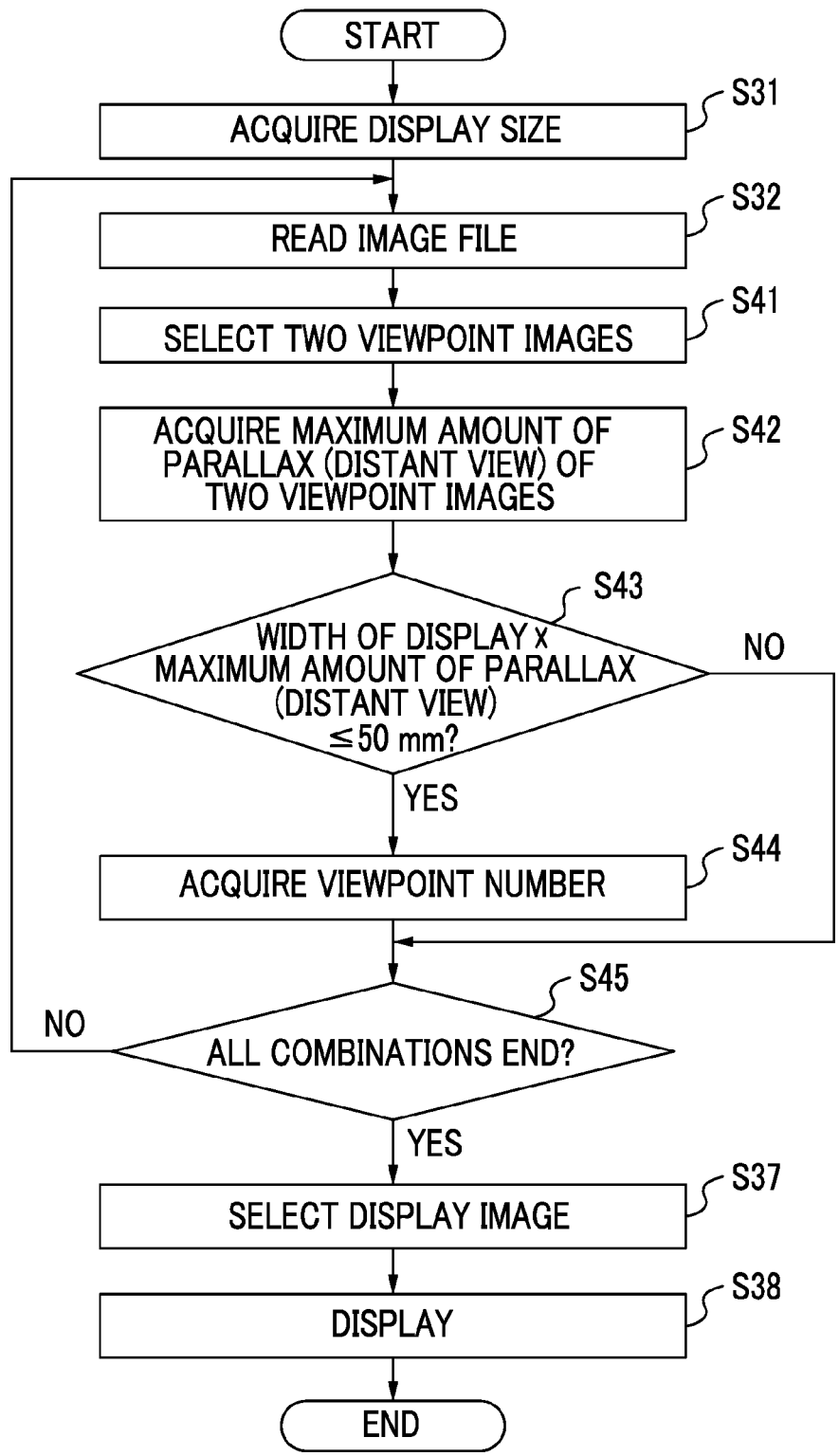
FIG. 15 is a flowchart showing reproduction and display processing.

FIG. 15 is a flowchart when images to be reproduced and displayed are selected on the basis of the maximum amount of parallax. The portions common to the flowchart shown in FIG. 14 are represented by the same reference numerals, and detailed description thereof will not be repeated. It is assumed that the maximum display size may not be recorded in the auxiliary information of each viewpoint image of the 3D image file to be read, and other kinds of auxiliary information are the same as the file shown in Table 1. Similarly, it is assumed that the lateral width of the display is 600 mm.

As in the case of FIG. 14, the size of the display is acquired (Step S31), and the 3D image file is read (Step S32). Next, two (a set of) viewpoint images are selected from the read 3D image file (Step S41). Finally, since the combinations of all images are selected, the selection order may be appropriately determined. Here, it is assumed that the viewpoint image (1) and the viewpoint image (2) are first selected.

The maximum amount of parallax (distant view) of the two selected images is acquired (Step S42). The maximum amount of parallax (distant view) recorded in the auxiliary information of each viewpoint image is the maximum amount of parallax to the reference viewpoint image. Accordingly, when the reference viewpoint image is not included in the two selected images, it is necessary to recalculate the maximum amount of parallax.

Here, since one of the two selected images is the viewpoint image (1) of the reference viewpoint, the maximum amount of parallax (distant view) recorded in the auxiliary information of the viewpoint image (2) becomes the maximum amount of parallax (distant view) of the two images.

Next, it is determined whether or not the product of the width of the display acquired in Step S31 and the maximum amount of parallax (distant view) of the two images acquired in Step S42 is equal to or smaller than the interocular distance of the person, 50 mm (Step S43). The interocular distance of the person is not limited to 50 mm, and a numerical value of, for example, 65 mm or the like may be used.

When the product is greater than 50 mm, since the maximum parallax position on the distant view side cannot be appropriately stereoscopically viewed, it is determined that the combination of the two viewpoint images is not appropriate for stereoscopic vision, and the process progresses to Step S45.

Here, the maximum amount of parallax (distant view) is 4%, and the product of the maximum amount of parallax and the display width of 600 mm becomes 24 mm. Accordingly, the condition that the product is equal to or smaller than 50 mm is satisfied, and the process progresses to Step S44. In Step S44, the viewpoint numbers of these two images are acquired. That is, here, the combination of the viewpoint numbers 1 and 2 is acquired.

In Step S45, it is determined whether or not the acquisition of the maximum amount of parallax ends for all combinations. Here, since the acquisition of the maximum amount of parallax does not end for all combinations, the process returns to Step S41.

Next, in Step S41, another two (a set of) viewpoint images are selected. Here, it is assumed that the two viewpoint images of the viewpoint image (2) and the viewpoint image (3) are selected.

In Step S42, the maximum amount of parallax (distant view) of the two images is acquired. As described above, since the maximum amount of parallax (distant view) recorded in the auxiliary information of each of the viewpoint image (2) and the viewpoint image (3) is the maximum amount of parallax to the viewpoint image (1) as the reference viewpoint image, it is necessary to recalculate the maximum amount of parallax of the two images of the viewpoint image (2) and the viewpoint image (3).

The maximum amount of parallax of the two images is calculated using the difference in the maximum amount of parallax (distant view) recorded in the auxiliary information. Accordingly, here, 7%−4%=3% becomes the maximum amount of parallax (distant view) of the two images.

In Step S43, it is determined whether or not the product of the calculated maximum amount of parallax (distant view) of the two images and the width of the display is equal to or smaller than 50 mm.

Here, the maximum amount of parallax (distant view) is 3%, and the product of the maximum amount of parallax and the display width of 600 mm becomes 18 mm. Accordingly, the condition that the product is equal to or smaller than 50 mm is satisfied, and the process progresses to Step S44. In Step S44, the viewpoint numbers of the two images, that is, the combination of the viewpoint numbers 2 and 3 is acquired.

In this way, the processing from Step S42 to Step S44 is repeated for the combinations of all images. With this processing, only the viewpoint numbers of the combinations of the images in which the product of the maximum amount of parallax (distant view) and the display size is equal to or smaller than 50 mm are acquired. Here, the combinations of the viewpoint numbers 1 and 2, 2 and 3, 2 and 4, and 3 and 4 are acquired.

Next, display images are selected from the combinations of the viewpoint numbers acquired in Step S44 (Step S37).

As the reference for selection, as described above, a combination with the greatest amount of parallax, a combination with the smallest amount of parallax, a combination including an image close to the center viewpoint, a combination in which an actual viewpoint image is given preference, or the like is considered. This reference may be determined in advance or may be freely set by the viewer. Here, it is assumed that the combination of the viewpoint number 2 and the viewpoint number 3 as the combination with the smallest amount of parallax, that is, the viewpoint image (2) and the viewpoint image (3) are selected.

Finally, the images selected in Step S37 are 3D-displayed on the 3D display (Step S38). That is, hear, 3D display is performed on the basis of the viewpoint image (2) and the viewpoint image (3). 3D display may be performed using the thumbnail images for display of the viewpoint images. When no viewpoint number is acquired in Step S35, that is, when the condition in Step S43 is not satisfied for all combinations, 2D display is performed. The reference for selection of images which are 2D-displayed may be appropriately determined.

In this way, the maximum amount of parallax (distant view) recorded as the auxiliary information of each viewpoint image is read, the product of the maximum amount of parallax and the display size of which display is actually performed is calculated, and a combination of images in which the product is smaller than the interocular distance of the person is selected and displayed, making it possible to constantly display an appropriate 3D image.

Sixth Embodiment

As described in the fifth embodiment, when selecting display images on the basis of the maximum display size recorded in the auxiliary information of each viewpoint image, only a combination including the reference viewpoint image can be selected. Meanwhile, when selecting display images on the basis of the maximum amount of parallax (distant view) recorded in the auxiliary information of each viewpoint image, the determination for the combinations of all images is possible; however, the processing becomes complicated.

Accordingly, in this embodiment, when both the maximum display size and the maximum amount of parallax (distant view) are recorded in the auxiliary information, display images are selected using both of information.

Figure 16:
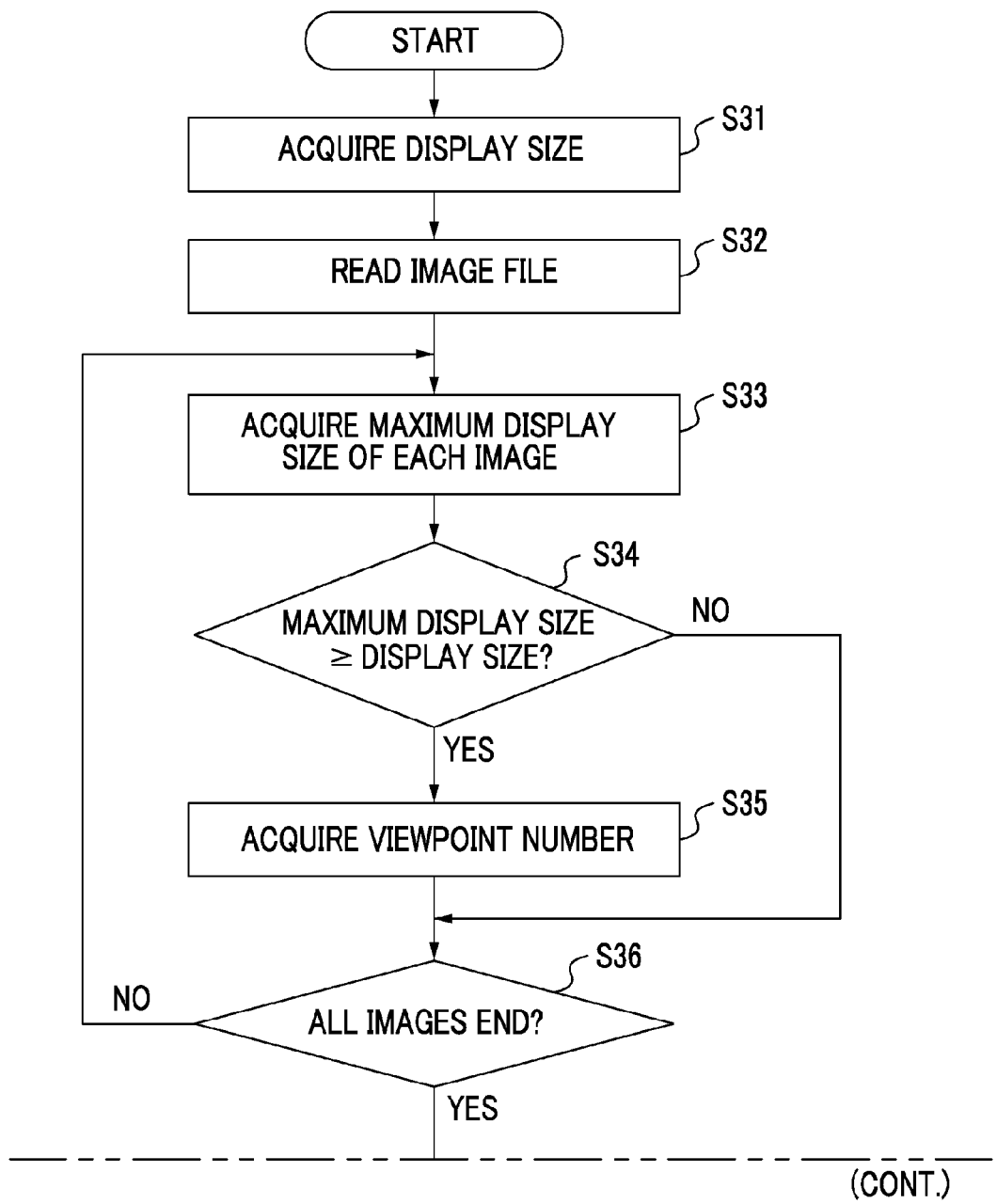
FIG. 16 is a flowchart showing reproduction and display processing.

FIG. 16 is a flowchart showing a case where display images are selected on the basis of the maximum display size and the maximum amount of parallax (distant view). The portions common to the flowcharts shown in FIGS. 14 and 15 are represented by the reference numerals, and detailed description thereof will not be repeated.

As shown in FIG. 16, first, as in the case of FIG. 14, images which can be 3D-displayed are selected on the basis of the maximum display size (Steps S33 to S35).

Thereafter, as in the case of FIG. 15, images which can be 3D-displayed are selected on the basis of the maximum amount of parallax (distant view) (Steps S41 to S44). At this time, it is not necessary to perform processing for the combinations including the reference viewpoint image.

Finally, display images are selected from the combinations including the reference viewpoint image acquired in Step S35 and a plurality of combinations of two images acquired in Step S44 (Step S37). The reference for selection may be appropriately determined in the same manner as before.

As described above, if images to be displayed are selected on the basis of the maximum display size and the maximum amount of parallax (distant view), the processing time can be reduced, and 3D display can be performed using appropriate images selected from all combinations.

Although images to be displayed are selected on the basis of only the maximum amount of parallax on the distant view side, images to be displayed may be determined taking into consideration the maximum amount of parallax on the near view side. Taking into consideration the maximum amount of parallax on the near view side, a combination of images which can be appropriately stereoscopically viewed can be determined on the near view side as well as the distant view side.

For example, a combination having the amount of parallax on the near view side is equal to or smaller than a predetermined value from a plurality of combinations of two images acquired in Step S44 may be selected. This is because, if the amount of parallax on the near view side increases, the viewer feels fatigued in stereoscopic vision, and thus the value equal to or smaller than 50 mm or the like is preferably used.

When the maximum amount of parallax on the near view side is recorded in the 3D image file, the value can be used. As described with reference to FIGS. 4A and 4B, the feature points may be extracted from each viewpoint image, and the position of the maximum amount of parallax on the near view side may be calculated.

Seventh Embodiment

FIG. 17 is a flowchart showing image reproduction processing of a seventh embodiment.

Here, it is assumed that a 3D image file to be read is the same as the file shown in Table 1. It is also assumed that the lateral width of the display is 1300 mm.

Initially, the display size of which 3D display is now performed is acquired (Step S51). For example, the display size is acquired from a display connected by an HDMI cable.

Next, a 3D image file is read (Step S52), and the value of a reference viewpoint number tag is read from the auxiliary information of the read 3D image file (Step S53). In this embodiment, the reference viewpoint number 1 is read.

Next, the image of the reference viewpoint number 1, that is, the maximum display size is acquired from the auxiliary information of the viewpoint image (1) (Step S54). As described above, the recorded value is the maximum display size in the combination of viewpoints having the maximum amount of parallax combination with the viewpoint image (1), specifically, the maximum display size in the combination with the viewpoint image (4).

The maximum display size is compared with the display size acquired in Step S51 (Step S55). When the maximum display size is greater than the display size (Yes), since there is no problem even when the viewpoint image (1) and the viewpoint image (4) are 3D-displayed directly, the two images are 3D-displayed on the 3D display (Step S56), and the process ends.

When the comparison result in Step S55 is No, the process progresses to Step S57.

In Step S57, the viewpoint numbers of all viewpoints in the read 3D image file are acquired. The value of the maximum amount of parallax of each image is acquired from the auxiliary information of each viewpoint image (Step S58). As shown in Table 1, the maximum amount of parallax of 4% is acquired from the viewpoint image (2), the maximum amount of parallax of 7% is acquired from the viewpoint image (3), and the maximum amount of parallax of 10% is acquired from the viewpoint image (4).

Next, the allowable amount of parallax in the display which performs 3D display is calculated (Step S59). The allowable amount of parallax is calculated by Expression 1. The display size indicates the lateral width of the display. Here, although the interocular distance of the person is 50 mm, other numerical values may be used.

$$\text{Allowable amount of parallax [\%]}=50 \text{ mm} \div \text{display size[mm]} \times 100 \quad \text{(Expression 1)}$$

In this embodiment, since the display size is 1300 mm, the allowable amount of parallax becomes about 3.85%.

Next, the arrangement of the reference viewpoint is confirmed (Step S60). When the reference viewpoint is not near the center from all viewpoints, the position of the viewpoint near the center is set as a new reference viewpoint (Step S61), and the maximum amount of parallax of the viewpoint image with respect to the new reference viewpoint is calculated (Step S62).

In this embodiment, since the viewpoint numbers are shown in FIG. 5, the viewpoint number 1 as the reference viewpoint is not near the center. Accordingly, the viewpoint number 2 which is a viewpoint near the center is set as the new reference viewpoint.

The maximum amount of parallax of each viewpoint image with respect to the viewpoint number 2 as the new reference viewpoint is calculated. In the example of the 3D image file of Table 1, the absolute value of the difference between the maximum amount of parallax described in the auxiliary information of each viewpoint image and the maximum amount of parallax described in the auxiliary information of the viewpoint image (2) becomes the maximum amount of parallax at the new reference viewpoint. Accordingly, the maximum amount of parallax of each viewpoint image is as described below.

maximum amount of parallax of viewpoint image (1)=|0%−|4% maximum amount of parallax of viewpoint image (2)=|4%−4%|=0% maximum amount of parallax of viewpoint image (3)=|7%−4%|=3% maximum amount of parallax of viewpoint image (4)=|10%−4%|=6%

The reason for performing such processing is that a viewpoint image arranged to be closer to the center is more suitable for 3D display.

When the processing of Step S62 ends or when it is determined in Step S60 that the reference viewpoint is near the center from all viewpoints, a viewpoint having the maximum value from the maximum amount of parallax equal to or smaller than the allowable amount of parallax is selected (Step S63). In this embodiment, since the allowable amount of parallax is equal to or smaller than 3.85%, the viewpoint satisfying the condition becomes the viewpoint number 3.

In this way, when the viewpoint satisfying the condition can be selected (Step S64), 3D display is performed using the reference viewpoint image and the selected image (Step S65). If the viewpoint cannot be selected (Step S64), and 2D display is performed (Step S66).

For example, if the acquired display size is 1700 mm, the allowable amount of parallax becomes 2.94%, and a viewpoint having the maximum value from the maximum amount of parallax equal to or smaller than the allowable amount of parallax cannot be selected. In this case, 2D display is performed.

In this way, since viewpoint images are selected on the basis of the allowable amount of parallax, viewpoint images appropriate for stereoscopic vision can be appropriately selected.

When a viewpoint image cannot be selected, instead of performing 2D display, 3D display may be performed after parallax displacement or parallax compression is performed to adjust the amount of parallax to an appropriate amount of parallax.

[Appearance of Stereoscopic Image Capturing Device]

Next, a device for realizing the above-described embodiment will be described.

Figure 18A:
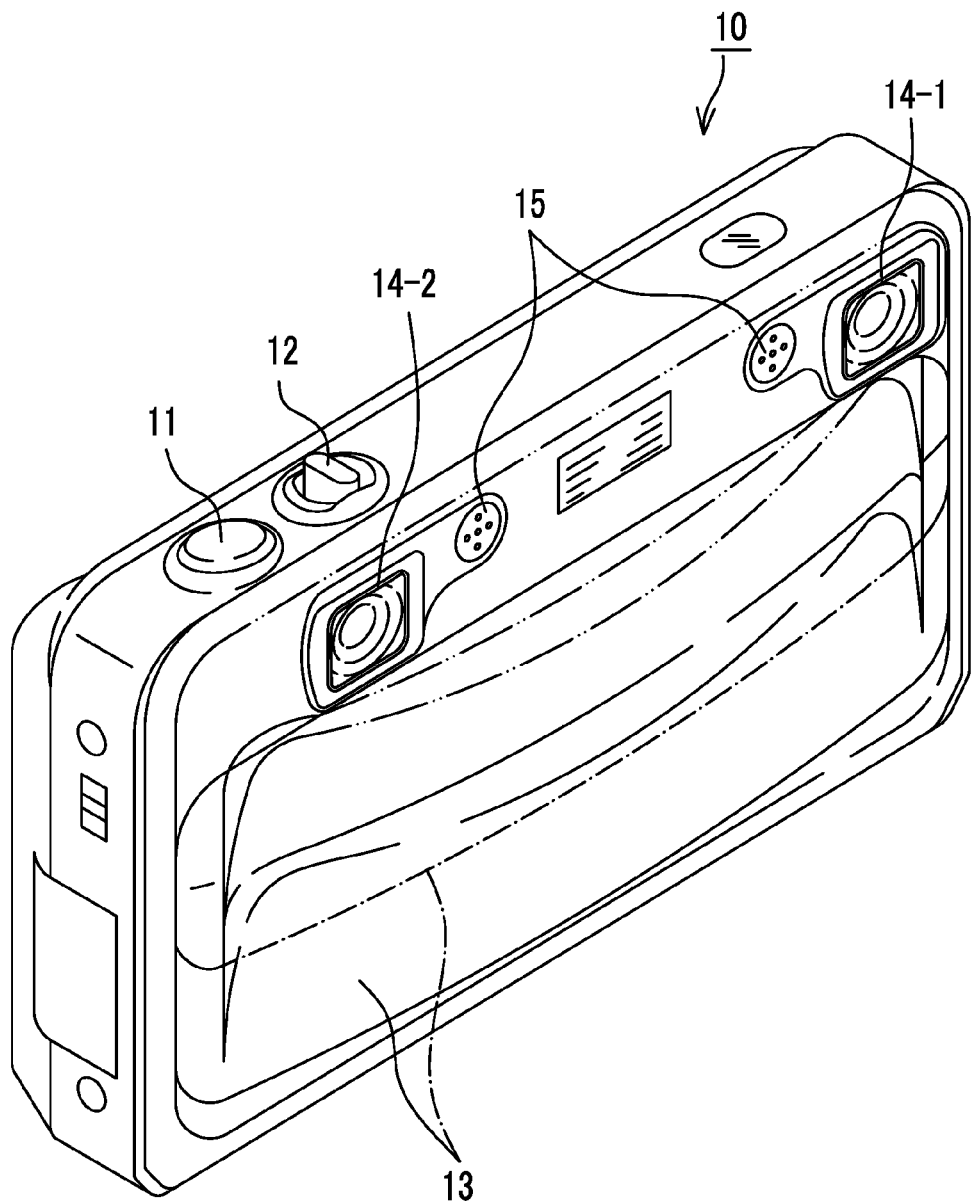
FIGS. 18A and 18B are diagrams showing the overall structure of a stereoscopic image reproduction device and a 3D display.
Figure 18B:
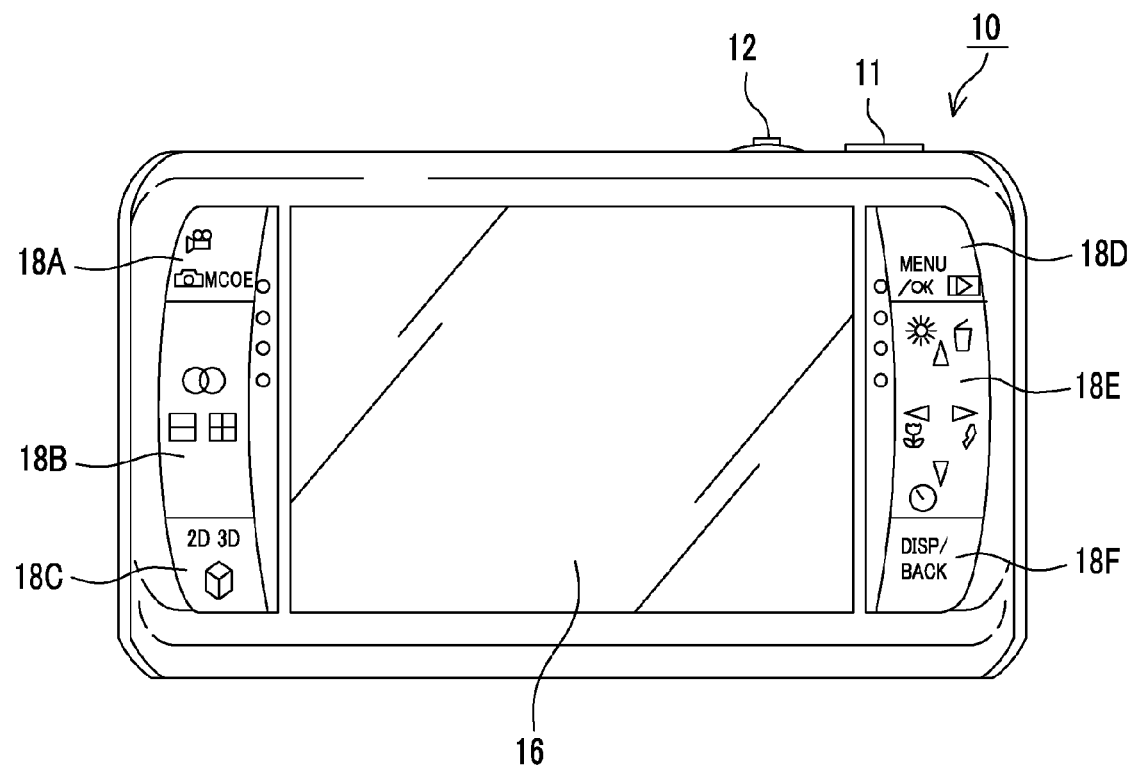

FIGS. 18A and 18B are diagrams showing the appearance of a stereoscopic image capturing device according to the invention. FIG. 18A is a perspective view when a stereoscopic image capturing device is viewed from the front side, and FIG. 18B is a rear view.

A stereoscopic image capturing device (fly-eye camera) 10 is a digital camera in which 2D/3D still images and 2D/3D motion images can be recorded. As shown in FIGS. 18A and 18B, a shutter button 11 and a zoom button 12 are provided on the top surface of a thin rectangular parallelepiped camera body.

A lens barrier 13 substantially having the same width as the width of the camera body in the left-right direction is provided on the front surface of the camera body to freely move in the up-down direction. The lens barrier 13 is moved in the up-down direction between a position indicated by a two-dot-chain line and a position indicated by a solid line to simultaneously open/close the front surfaces of a pair of left and right photographing optical systems 14-1 and 14-2. As the photographing optical systems 14-1 and 14-2, zoom lenses of bent optical systems are used. A camera power supply can be turned on/off in conjunction with the opening/closing operation of the lens front surface by the lens barrier 13.

As shown in FIG. 18B, a liquid crystal monitor 16 for 3D is provided in the center portion on the rear surface of the camera body. The liquid crystal monitor 16 can display a plurality of parallax images (right viewpoint image and left viewpoint image) as directional images having predetermined directivity by a parallax barrier. As the liquid crystal monitor 16 for 3D, a liquid crystal monitor using a lenticular lens, a liquid crystal monitor in which a right viewpoint image and a left viewpoint image can be individually viewed using dedicated glasses, such as polarization glasses or liquid crystal shutter glasses, or the like may be applied.

Various operating switches are provided on the left and right sides of the liquid crystal monitor 16. An operating switch 18A is a selector switch for switching between still image photographing and motion image photographing, an operating switch 18B is a parallax adjustment switch for adjusting the amount of parallax of a right viewpoint image and a left viewpoint image, and an operating switch 18C is a selector switch for switching between 2D imaging and 3D imaging. An operating switch 18D is a seesaw key serving as a MENU/OK button and a play button, an operating switch 18E is a multi-function cross key, and an operating key 18F is a DISP/BACK key.

The MENU/OK button is an operating switch which has a function as a menu button for giving an instruction to display a menu on the screen of the liquid crystal monitor 16 and a function as an OK button for instructing the confirmation and execution of a selected content, or the like. The play button is a button which is used for switching from a photographing mode to a reproduction mode. The cross key is an operating switch which inputs instructions in four directions of up, down, left, and right, and a macro button, a flash button, a self-timer button, and the like are assigned. When the menu is selected, the cross key functions as a switch (cursor movement operating part) for switching an item from the menu screen or for instructing the selection of various setting items from each menu. The left/right key of the cross key functions as a frame-by-frame playback (forward/reverse playback) button in the reproduction mode. The DISP/BACK key is used to switch the display form of the liquid crystal monitor 16, to cancel an instruction content on the menu screen, to return an operation state to a previous operation state, or the like.

In FIG. 18A, reference numeral 15 denotes a stereo microphone.

[Internal Configuration of Stereoscopic Image Capturing Device]

Figure 19:
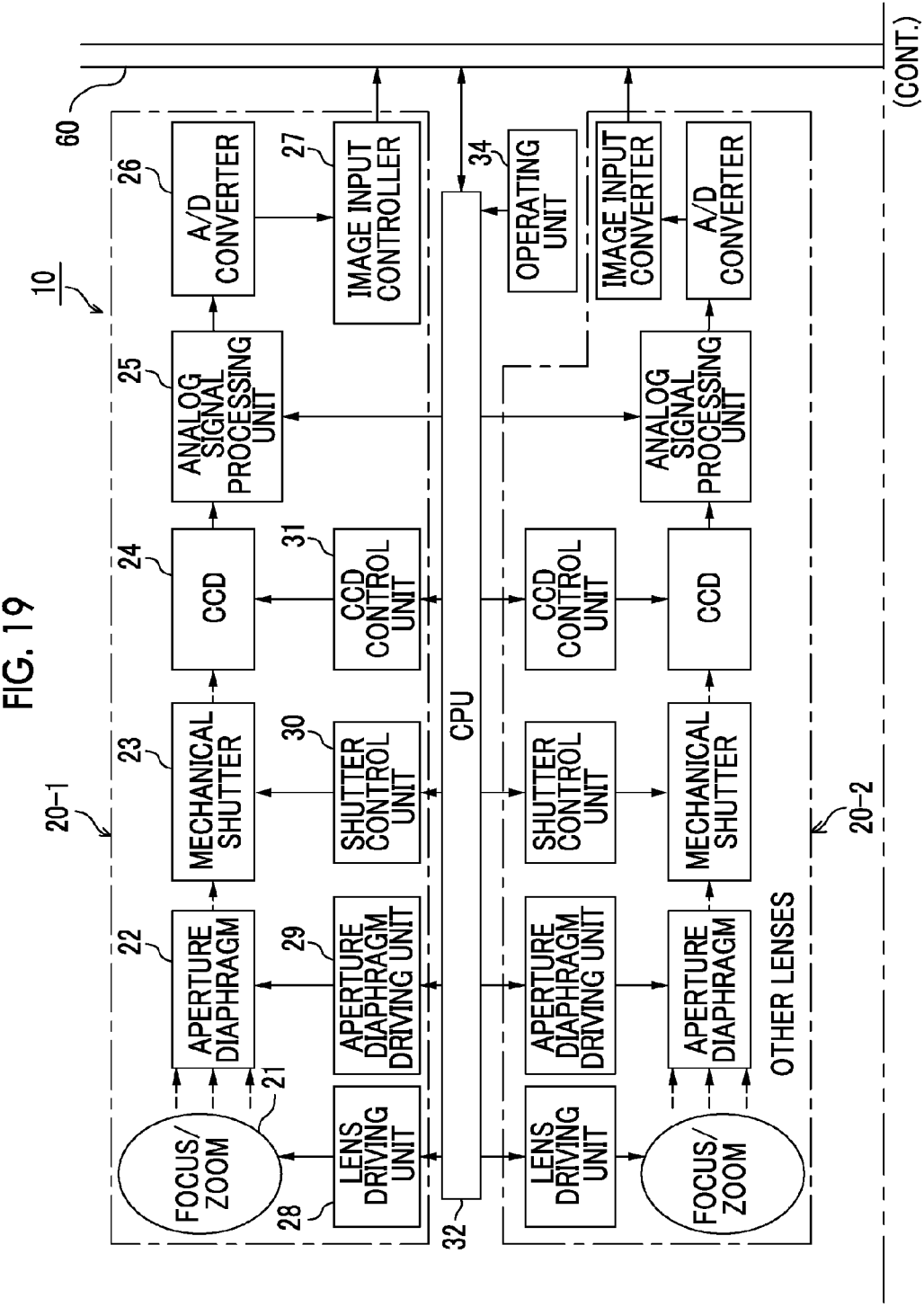
FIG. 19 is a block diagram showing the internal configuration of a stereoscopic image reproduction device.

FIG. 19 is a block diagram showing the internal configuration of the stereoscopic image capturing device 10.

As shown in FIG. 19, the stereoscopic image capturing device 10 primarily has a plurality of image capturing units 20-1 and 20-2, a central processing unit (CPU) 32, an operating unit 34 including the shutter button 11 and the zoom button 12 described above and various operating switches, a display control unit 36, a liquid crystal monitor 16, a recording control unit 38, a compression/expansion processing unit 42, a digital signal processing unit 44, an AE (Automatic Exposure) detection unit 46, an AF (Auto Focus) detection unit 48, an AWB (Automatic White Balance) detection unit 50, a VRAM 52, a RAM 54, a ROM 56, an EEPROM 58, and the like. Although the image capturing units 20-1 and 20-2 capture two parallax images of an image for a left eye and an image for a right eye having parallax, three or more image capturing units 20 may be provided.

The image capturing unit 20-1 which captures the image for the left eye includes a prism (not shown), a photographing optical system 14-1 (FIGS. 18A and 18B) having a focus lens/zoom lens 21, optical units having an aperture diaphragm 22 and a mechanical shutter 23, a solid-state image capturing element (CCD) 24, an analog signal processing unit 25, an A/D converter 26, an image input controller 27, a lens driving unit 28, an aperture diaphragm driving unit 29, and a shutter control unit 30 for driving the optical units, and a CCD control unit 31 for controlling the CCD 24. The image capturing unit 20-2 which captures the image for the right eye has the same configuration as the image capturing unit 20-1 which captures the image for the left eye, thus description of a specific configuration will be omitted.

The CPU 32 performs overall control of the operation of the entire camera in accordance with a predetermined control program on the basis of an input from the operating unit 34. The calculation of the maximum display size, parallax displacement, the generation of the virtual viewpoint image, and the like are performed by the CPU 32.

The ROM 56 stores a control program executed by the CPU 32 and various kinds of data necessary for control, and the EEPROM 58 stores various kinds of information representing the adjustment result of adjustment before product shipment, for example, defective pixel information of the CCD 24, correction parameters which are used for image processing, a correspondence table of the maximum amount of parallax and the maximum display size, and the like.

The VRAM 52 is a memory which temporarily stores image data for display on the liquid crystal monitor 16, and the RAM 54 includes a computational work area of the CPU 32 and a temporary storage area of image data.

The focus lens/zoom lens 21 included in the photographing optical system is driven by the lens driving unit 28 and moves back and forth along the optical axis. The CPU 32 controls the driving of the lens driving unit 28 to control the position of the focus lens and to perform focus adjustment such that the subject comes into focus, and controls the zoom position of the zoom lens in accordance with a zoom instruction from the zoom button 12 of the operating unit 34 to change a zoom magnification.

The aperture diaphragm 22 has, for example, an iris diaphragm, and is driven and operated by the aperture diaphragm driving unit 29. The CPU 32 controls the amount (aperture value) of opening of the aperture diaphragm 22 through the aperture diaphragm driving unit 29, and controls the amount of incident light on the CCD 24.

The mechanical shutter 23 opens/closes the optical path to determine the exposure time in the CCD 24, and prevents unwanted light from being incident on the CCD 24 when reading an image signal from the CCD 24, thereby preventing the occurrence of smear. The CPU 32 outputs a shutter closing signal synchronized with the exposure end time corresponding to a shutter speed to the shutter control unit 30, and controls the mechanical shutter 23.

The CCD 24 has a two-dimensional color CCD solid-state image capturing element. Multiple photodiodes are two-dimensionally arranged on the light-receiving surface of the CCD 24, and color filters are disposed in each photodiode with a predetermined arrangement.

The optical image of the subject focused on the CCD light-receiving surface through the optical units having the above-described configuration is converted to a signal charge according to the amount of incident light by the photodiodes. The signal charges accumulated in each photodiode are sequentially read from the CCD 24 as a voltage signal (image signal) according to the signal charges in accordance with an instruction of the CPU 32 on the basis of a driving pulse from the CCD control unit 31. The CCD 24 has an electronic shutter function, and controls a charge accumulation time into the photodiode to control the exposure time (shutter speed). The charge accumulation start time corresponding to the shutter speed is controlled by the electronic shutter, and the mechanical shutter 23 is closed to control the exposure end time (charge accumulation end time). Although in this embodiment, the CCD 24 is used as an image capturing element, an image capturing element having a different configuration, such as a CMOS sensor, may be used.

R, G, and B analog signals read from the CCD 24 are subjected to double-correlated sampling (CDS) or amplification by the analog signal processing unit 25, and converted to R, G, and B digital signals by the A/D converter 26.

The image input controller 27 has an internal line buffer of a predetermined capacity, temporarily accumulates R, G, and B image signals (CCD RAW data) A/D converted by the A/D converter 26, and stores the R, G, and B image signals in the RAM 54 through a bus 60.

In a 3D image capturing mode, the CPU 32 controls the image capturing unit 20-2 which captures the right viewpoint image in the same manner as the image capturing unit 20-1 which captures the left viewpoint image.

The AE detection unit 46 calculates subject luminance necessary for AE control on the basis of the image signals introduced when the shutter button 11 is half-pressed, and outputs a signal representing subject luminance (photographing EV value) to the CPU 32. The CPU 32 sets the shutter speed (exposure time), the aperture value, and photographing sensitivity in a plurality of image capturing units 20-1 and 20-2 in accordance with a predetermined program diagram on the basis of the input photographing EV value.

The AF detection unit 48 integrates the absolute value of a high-frequency component of an image signal of an AF area introduced when the shutter button 11 is half-pressed, and outputs the integrated value (AF evaluation value) to the CPU 32. The CPU 32 moves the focus lens from a close range side to an infinite side, searches for a focusing position where the AF evaluation value detected by the AF detection unit 48 is maximal, and moves the focus lens to the focusing position, thereby performing focus adjustment on the subject (main subject). During motion image photographing, so-called mountain-climbing control is performed to move the focus lens such that the AF evaluation value constantly has the maximum value.

The AWB detection unit 50 automatically obtains a light source type (color temperature of field) on the basis of the R, G, and B image signals acquired during this image capturing, and reads a corresponding white balance gain from a table which stores R, G, and B white balance gains (white balance correction values) according to the light source type in advance.

The digital signal processing unit 44 includes a white balance correction circuit, a gradation conversion processing circuit (for example, a gamma correction circuit), a synchronization circuit which interpolates spatial deviations of color signals of R, G, B, and the like depending on the color filter arrangement of a single-plate CCD to position the color signals, a contour correction circuit, a luminance/color difference signal generation circuit, and the like, and performs image processing on the R, G, and B image signals (CCD RAW data) stored in the RAM 54. That is, R, G, and B CCD RAW data are subjected to white balance correction by multiplying the white balance gains detected by the AWB detection unit 50 in the digital signal processing unit 44, then subjected to the predetermined processing, such as gradation conversion processing (for example, gamma correction), and converted to YC signals having a luminance signal (Y signal) and a color-difference signal (Cr and Cb signals). The YC signals processed by the digital signal processing unit 44 are stored in the RAM 54.

The digital signal processing unit 44 also includes a distortion correction circuit which corrects lens distortion of the photographing optical systems of a plurality of image capturing units 20-1 and 20-2, and an image clipping circuit which clips images of predetermined clipping areas from the left and right viewpoint images to correct optical axis deviations of the photographing optical systems of a plurality of image capturing units 20-1 and 20-2.

The compression/expansion processing unit 42 compresses the YC signals stored in the RAM 54 in accordance with an instruction from the CPU 32 during recording in a memory card 40, or expands compressed data recorded in the memory card 40 to obtain the YC signals.

The recording control unit 38 converts compressed data compressed by the compression/expansion processing unit 42 to an image file of a predetermined format (for example, a 3D still image becomes an MP file, and a 3D motion image becomes a motion image file of motion JPEG, H.264, MPEG4, or MPEG4-MVC), records the image file in the memory card 40, or reads an image file from the memory card 40.

The recording control unit 38 records the maximum display size, the supposed visual distance, the maximum amount of parallax (near view) (%), the maximum amount of parallax (distant view) (%), and the like as auxiliary information in the memory card 40 along with Exif auxiliary information, when recording an MP file according to the invention.

The liquid crystal monitor 16 is used as an image display unit which displays photographed images, and is also used as a GUI (Graphical User Interface) during various settings. The liquid crystal monitor 16 is also used as an electronic viewfinder which displays live view images (hereinafter, referred to as "through images" for confirming an image angle in the photographing mode. When a 3D image is displayed on the liquid crystal monitor 16, the display control unit 36 alternately displays a left viewpoint image and a right viewpoint image held in the VRAM 52 pixel by pixel. With the parallax barrier provided in the liquid crystal monitor 16, left and right images alternately arranged pixel by pixel are separately viewed by the left and right eyes of the user who observes at a predetermined distance. Accordingly, stereoscopic vision is possible.

With the stereoscopic image capturing device 10 configured as above, the embodiment can be realized.

[Stereoscopic Image Reproduction Device]

Fifth to eighth embodiments may be realized in a stereoscopic image reproduction device in which no image capturing unit is provided.

FIG. 22 is a diagram showing the overall configuration of a stereoscopic image reproduction device 300 and a 3D display 320 according to the invention. As shown in FIG. 22, the stereoscopic image reproduction device 300 and the 3D display 320 are separate devices and are communicably connected together by a communication cable 310.

The 3D display 320 is a parallax barrier-type or a lenticular-type display, and a left viewpoint image and a right viewpoint image input from the stereoscopic image reproduction device 300 to the 3D display 320 are alternately displayed line by line.

The 3D display 320 may alternately switch and display the left viewpoint image and the right viewpoint image in a temporal manner. In this case, the viewer views the 3D display 320 using special glasses.

FIG. 23 is a block diagram showing the internal configuration of the stereoscopic image reproduction device 300. As shown in FIG. 23, the stereoscopic image reproduction device 300 includes a CPU 301, a recording control unit 305, a memory card 306, a display control unit 307, a communication interface 308, and the like.

The CPU 301 performs overall control of the operation of the entire stereoscopic image reproduction device 300 on the basis of a control program recorded in a ROM 302. A RAM 303 is used as a computational work area of the CPU 301.

The recording control unit 305 and the display control unit 307 are connected to the CPU 301 through a bus 304. The recording control unit 305 controls data reading and writing of a 3D image file with respect to the memory card 306. The memory card 306 is, for example, the same as the memory card 40 of the stereoscopic image capturing device 10 shown in FIG. 19, and records a 3D image file including the viewpoint images photographed in the stereoscopic image capturing device 10 and auxiliary information.

The communication interface 308 is a connector unit to which a communication cable 310 is connected, and the display control unit 307 displays a stereoscopic image on the 3D display 320 through the communication interface 308 and the communication cable 310. As the communication interface 308 and the communication cable 310, those based on the HDMI standard may be used. According to the HDMI standard, the stereoscopic image reproduction device 300 can acquire the display size of the 3D display 320 connected thereto through the communication cable 310.

Fly-eye image capturing part for photographing viewpoint images may be provided in the stereoscopic image reproduction device 300, and the photographed viewpoint images may be recorded in the memory card 306. The stereoscopic image reproduction device 300 and the 3D display 320 may be constituted as a single device.

What is claimed is:

1. A stereoscopic image reproduction device comprising:
   first acquisition part for reading a three-dimensional image file having recorded therein N viewpoint images for stereoscopic vision of N (N: an integer equal to or greater than 3) viewpoints and auxiliary information corresponding to the N viewpoint images, the auxiliary information including the (N−1) maximum display sizes corresponding to the maximum amount of parallax on a distant view side between two viewpoint images of different combinations of a viewpoint image of a reference viewpoint set in advance from the N viewpoint images and other (N−1) viewpoint images, and the maximum display size enabling binocular fusion when the two viewpoint images are displayed on a stereoscopic display, and acquiring the N viewpoint images and auxiliary information from the three-dimensional image file;
   second acquisition part for acquiring the display size of the stereoscopic display as an output destination;
   first determination part for comparing the acquired display size of the stereoscopic display with the (N−1) maximum display sizes to determine whether or not the display size of the stereoscopic display is greater than the (N−1) maximum display sizes;
   selection part for selecting a set of two viewpoint images from a set or a plurality of sets of two viewpoint images corresponding to the maximum display size which is determined by the first determination part to be equal to or smaller than the display size of the stereoscopic display from the (N−1) maximum display sizes; and output part for outputting one viewpoint image from the N viewpoint images to the stereoscopic display if the first determination part determines that the display size of the stereoscopic display is greater than the (N−1) maximum display sizes and outputting the two viewpoint images selected by the selection part to the stereoscopic display if the first determination part determines that the display size of the stereoscopic display is equal to or smaller than one maximum display size from the (N−1) maximum display size.

2. The stereoscopic image reproduction device according to claim 1, wherein the selection part preferentially selects two viewpoint images corresponding to a viewpoint image the reference viewpoint set in advance from the plurality of sets of two viewpoint images.

3. The stereoscopic image reproduction device according to claim 1, wherein the selection part selects two viewpoint images having the greatest maximum amount of parallax from the plurality of sets of two viewpoint images.

4. The stereoscopic image reproduction device according to claim 1, wherein the selection part selects two viewpoint images having the smallest maximum amount of parallax from the plurality of sets of two viewpoint images.

5. The stereoscopic image reproduction device according to claim 1, wherein the selection part preferentially selects two viewpoint images including a centermost viewpoint image in the sequence of viewpoints from the plurality of sets of two viewpoint images.

6. The stereoscopic image reproduction device according to claim 1, further comprising:

part for acquiring the maximum amount of parallax on a near view side of the plurality of sets of two viewpoint images, wherein the selection part selects a set of two viewpoint images from the plurality of sets of two viewpoint images on the basis of the acquired maximum amount of parallax on the near view side.

7. The stereoscopic image reproduction device according to claim 1, wherein, when the N viewpoint images recorded in the three-dimensional image file include a plurality of mixed viewpoint images corresponding to an actual viewpoint and virtual viewpoint images corresponding to a virtual viewpoint generated from the plurality of viewpoint images corresponding to the actual viewpoint, the selection part preferentially selects two viewpoint images including the viewpoint image of the actual viewpoint from the plurality of sets of two viewpoint images.

8. A stereoscopic image capturing device comprising:

image capturing part for acquiring a plurality of viewpoint images of the same subject from a plurality of viewpoints;

parallax amount calculation part for calculating the amount of parallax representing the amount of deviation between feature points having common features from the plurality of acquired viewpoint images;

maximum parallax amount acquisition part for acquiring the maximum amount of parallax on a distant view side from the calculated amount of parallax of each feature point;

maximum display size acquisition part for acquiring the maximum display size enabling binocular fusion when the plurality of viewpoint images are displayed on a stereoscopic display on the basis of the acquired maximum amount of parallax on the distant view side;

recording part for generating a three-dimensional image file in which the plurality of viewpoint images are recorded, and recording the three-dimensional image file in a recording medium, the recording part recording the plurality of viewpoint images in the three-dimensional image file and also recording the maximum amount of parallax on the distant view side and the maximum display size in the three-dimensional image file as auxiliary information; and the stereoscopic image reproduction device according to claim 1.

9. A stereoscopic display device comprising:

a stereoscopic display as an output destination; and the stereoscopic image reproduction device according to claim 1.

10. A stereoscopic image reproduction method using the stereoscopic image reproduction device according to claim 1 comprising:

a first acquisition step of reading a three-dimensional image file having recorded therein N viewpoint images for stereoscopic vision of N (N: an integer equal to or greater than 3) viewpoints and auxiliary information corresponding to the N viewpoint images, the auxiliary information including the (N−1) maximum display sizes corresponding to the maximum amount of parallax on a distant view side between two viewpoint images of different combinations of a viewpoint image of a reference viewpoint set in advance from the N viewpoint images and other (N−1) viewpoint images, and the maximum display size enabling binocular fusion when the two viewpoint images are displayed on a stereoscopic display, and acquiring the N viewpoint images and auxiliary information from the three-dimensional image file;

a second acquisition step of acquiring the display size of the stereoscopic display as an output destination;

a first determination step of comparing the acquired display size of the stereoscopic display with the (N−1) maximum display sizes to determine whether or not the display size of the stereoscopic display is greater than the (N−1) maximum display sizes;

a selection step of selecting a set of two viewpoint images from a set or a plurality of sets of two viewpoint images corresponding to the maximum display size which is determined in the first determination step to be equal to or smaller than the display size of the stereoscopic display from the (N−1) maximum display sizes; and an output step of outputting one viewpoint image from the N viewpoint images to the stereoscopic display if it is determined in the first determination step that the display size of the stereoscopic display is greater than the (N−1) maximum display sizes and outputting the two viewpoint images selected in the selection step to the stereoscopic display if it is determined in the first determination step that the display size of the stereoscopic display is equal to or smaller than one maximum display size from the (N−1) maximum display size.

* * * * *